United States Patent [19]

Cheney et al.

[11] 3,974,343

[45] Aug. 10, 1976

[54] SMALL MODULAR COMMUNICATIONS SWITCHING SYSTEM WITH DISTRIBUTED PROGRAMMABLE CONTROL

[75] Inventors: Thomas K. Cheney, Prospect; Anatol Kuczura, Worthington, both of Ohio

[73] Assignee: North Electric Company, Galion, Ohio

[22] Filed: Jan. 10, 1975

[21] Appl. No.: 540,077

[52] U.S. Cl. ............................................. 179/18 ES
[51] Int. Cl.[2] ......................................... H04Q 3/54
[58] Field of Search ................................ 179/18 ES

[56] References Cited
UNITED STATES PATENTS

| | | | |
|---|---|---|---|
| 3,483,524 | 12/1969 | De Buck et al. ................. | 340/172.5 |
| 3,553,384 | 1/1971 | Lucas et al. ...................... | 179/18 ES |
| 3,749,844 | 7/1973 | Dufton ............................. | 179/18 ES |

Primary Examiner—Thomas W. Brown
Attorney, Agent, or Firm—Johnson, Dienner, Emrich & Wagner

[57] ABSTRACT

A telephone central office switching system with economical application to small community dial office sizes is disclosed. Communication paths are spatially switched over a modular network fabric comprised of electromechanically actuated metallic crosspoints. A distributed control concept is employed wherein the logic power and flexibility of electronic stored program control is spread over many points in the system. Serial asynchronous messages between any two control elements are routed via a central information exchange unit whose number of communication ports is easily changed on a pluggable basis. Modularity is emphasized throughout the switching system for facile growth and additions of feature-oriented service packages.

16 Claims, 19 Drawing Figures

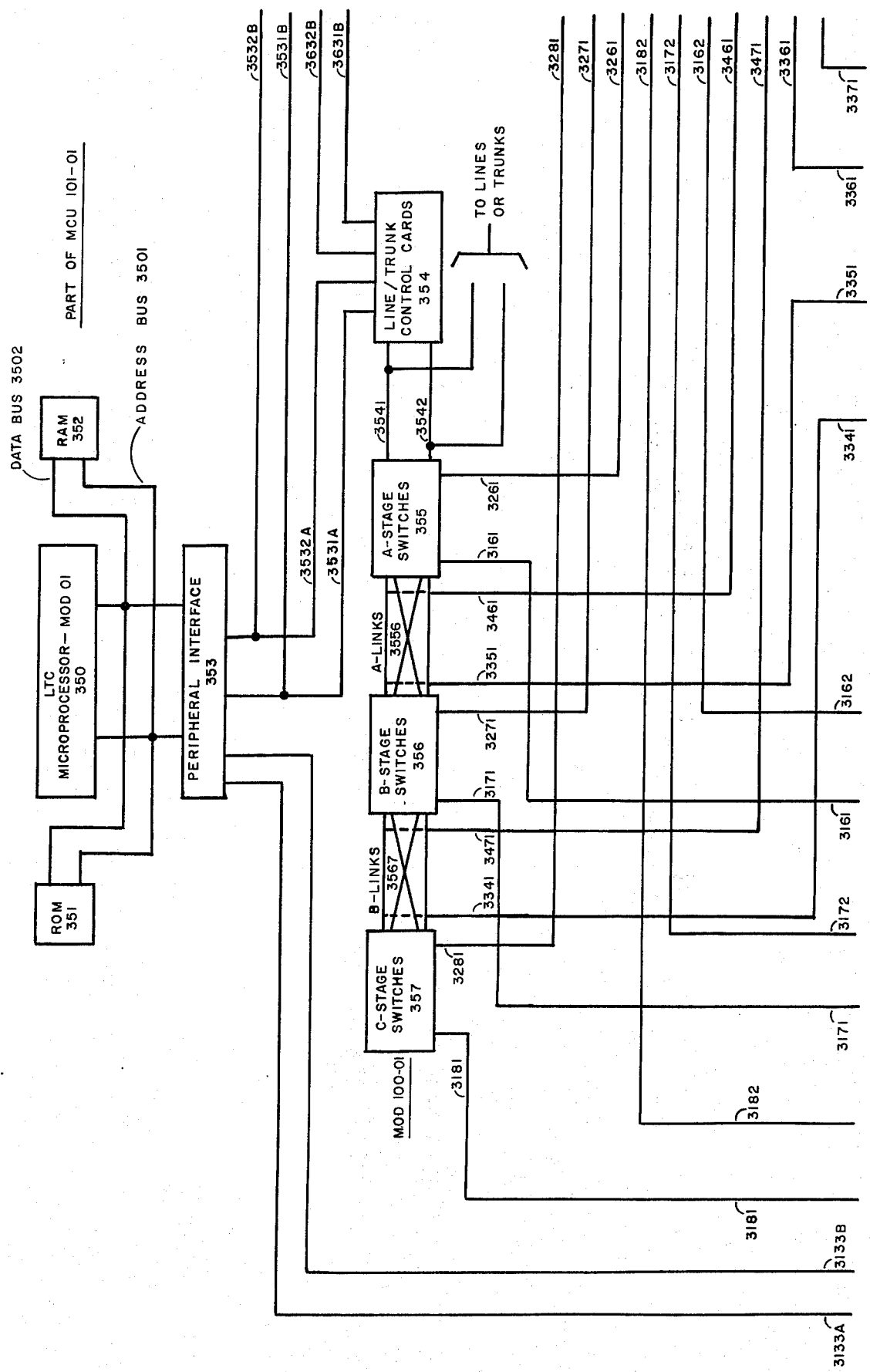

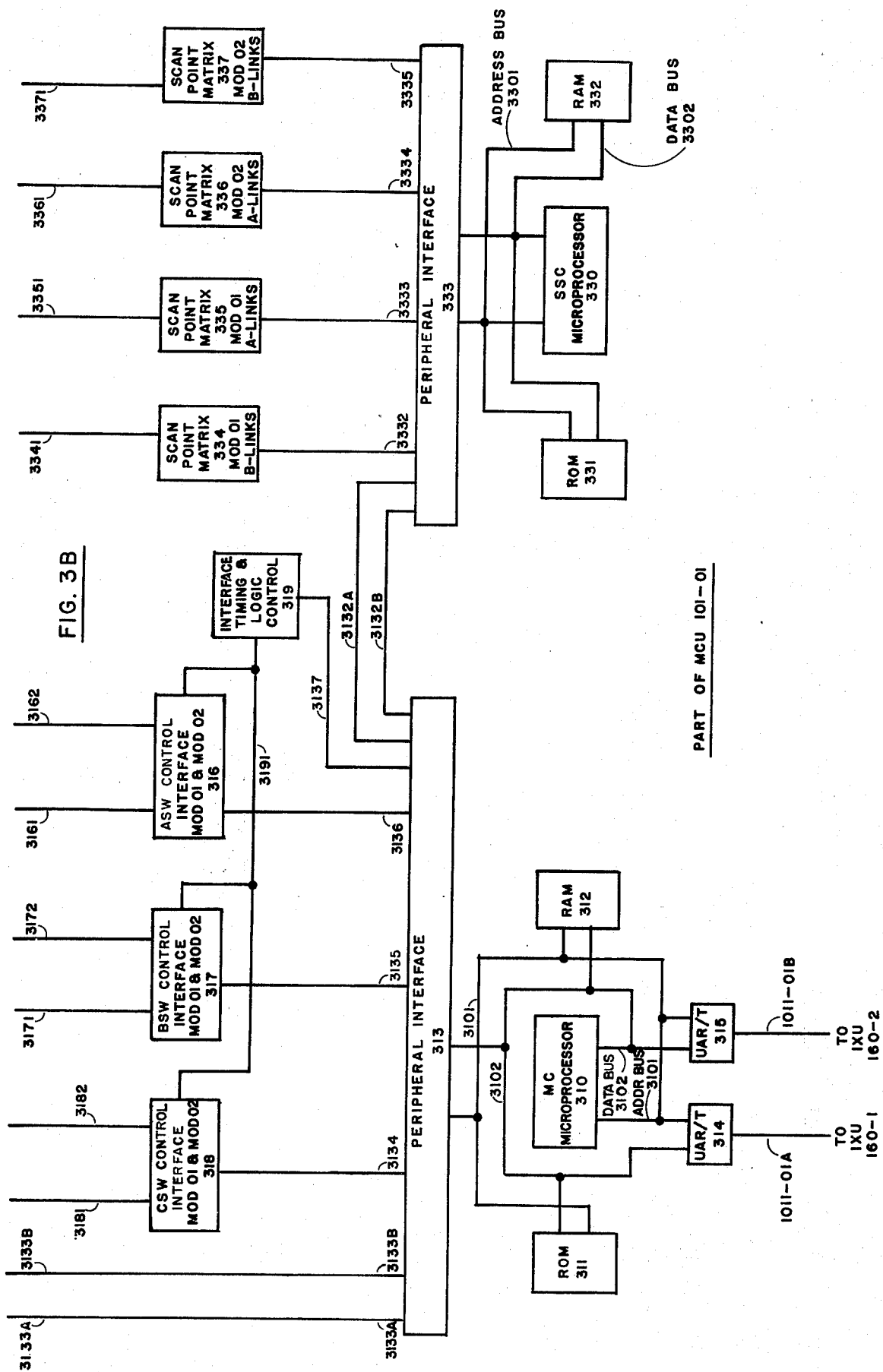

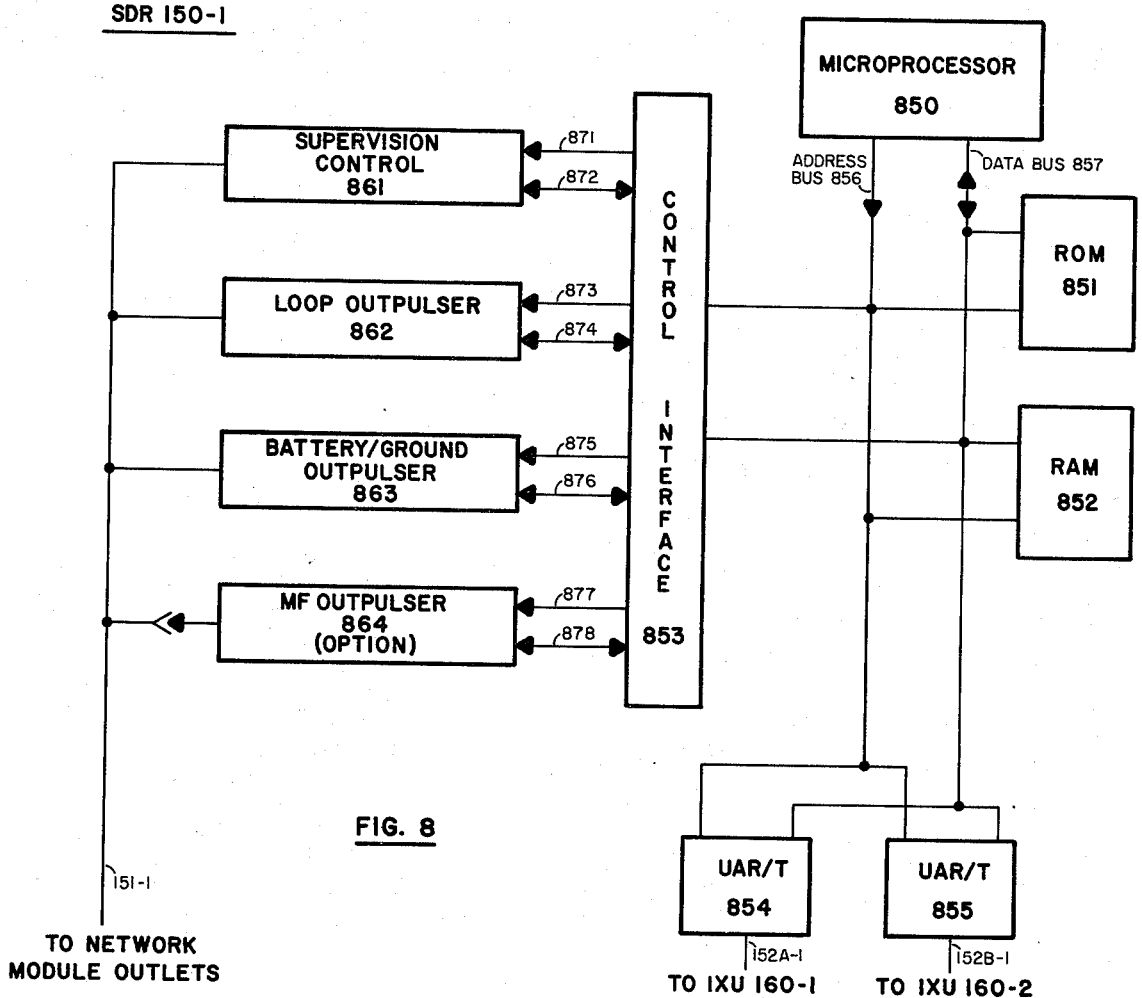

FIG. 8

INTER-UNIT CONTROL MESSAGE CONVENTIONS

| b7 | b6 | b5 | b4 | b3 | b2 | b1 | b0 | |
|----|----|----|----|----|----|----|----|---|
| \multicolumn{4}{|c|}{DATA OR INSTRUCTION} | ∅ | ∅ | 1 | 1 | DESTINATION ADDRESS IN BITS b2 THROUGH b7 |
| | | | | ∅ | ∅ | 1 | 0 | ORIGINATION ADDRESS IN BITS b2 THROUGH b7 |
| | | | | 0 | 1 | 0 | 1 | CONTINUATION MARK |
| | | | | 1 | 0 | 0 | 1 | CRC-CYCLIC REDUNDANCY CHARACTER |
| | | | | 1 | 1 | 0 | 1 | EOM-END OF MESSAGE MARK |
| | | | | 0 | 0 | 0 | 0 | TROUBLE CONDITION MESSAGE |
| | | | | 0 | 0 | 0 | 1 | FUTURE SPARE |
| | | | | 1 | 1 | 0 | 0 | FUTURE SPARE |
| | | | | 0 | 1 | 0 | 0 | FUTURE SPARE |
| | | | | 1 | 0 | 0 | 0 | FUTURE SPARE |

FIG. 9

∅ = 0 or 1, PART OF ADDRESS IN BITS b2 THROUGH b7.

LINE CONTROL CARD – LOGICAL DATA ORGANIZATION

NUMBER GROUP TRANSLATION – DIALED DIGITS = $d_1 d_2 d_3 - d_4 d_5 d_6 d_7$

3 DIGIT TRANSLATION – OUTGOING OFFICE CODE = $d_1 d_2 d_3$

SWITCHING NETWORK CONNECTIONS RELATED TO INTRA-OFFICE CALL DESCRIPTION

SWITCHING NETWORK CONNECTIONS RELATED TO OUTGOING CALL DESCRIPTION

SMALL MODULAR COMMUNICATIONS SWITCHING SYSTEM WITH DISTRIBUTED PROGRAMMABLE CONTROL

FIELD OF THE INVENTION

This invention relates to automatic telephone switching systems having stored program control. More particularly, this invention concerns space division switching controlled by distributed programmable elements in a small size telephone exchange.

DESCRIPTION OF PRIOR ART

Systems of the prior art feature powerful and expensive central processor units (CPU) one of which is usually capable of controlling most, if not all, portions of the central office peripheral equipment. This high degree of centralization of control functions has been justified by high processor hardware costs dictating the assignment of as many system functions to the CPU as possible to achieve efficient high occupancy of that entity contributing the most to the system's getting-started cost.

Such powerful CPU's further dictate the necessity for complex coordination schemes for gathering input information and disbursing output information between a processor control entity and a large plurality of peripheral elements (e.g., scanning and signal distribution and the accompanying timing and interrupt facilities required).

Such stored program control philosophy of the prior art also leads to complexity and expense in software development. Real-time control of a large number of different type elements requires large executive monitors and high processor execution overhead which leads to decreased CPU call processing capacity.

Systems of the prior art are further complicated with regard to program and/or CPU feature changes and additions since these dictate the incorporation of methods for smooth system transitional operation while effecting such changes or additions.

The prior art also includes the multiprocessor approach to control of telephone switching systems wherein a plurality of parallel-operating CPU's share the system load in an attempt to generate more real-time capacity for the telephone exchange. However the prior art multiprocessor philosophy retains the characteristic of high complexity, especially in the area of CPU intercommunication and system-wide synchronous operation. Inefficiency also arises from duplication of memory and processor logic.

Whether involving a single CPU or a multiprocessor approach, prior art telephone switching systems have proven uneconomical for application to the lower line size range. The major contributors to high first cost are large expensive processors with supporting system and application software development, and complex high speed interfaces (such as multiplexors, clocked bussing schemes, etc.). Hence it is seen that there is a problem in the prior art in economically furnishing stored program control with a minimum of wasted excess capacity for small telephone switching systems.

SUMMARY OF THE INVENTION

Objects of the Invention

An object of this invention is to reduce the major contributors to high first cost of small electronic telephone exchanges by means of a design philosophy incorporating stored program controllers distributed throughout the system and chosen to better match the processing capacity requirements of a small office.

A further object of this invention is to introduce an arrangement for intercommunication among telephone switching system control elements utilizing low-speed, asynchronously operating, serial-by-bit busses from each control element to a central information exchange unit, thus simplifying all system control interfaces and making addition of new control elements more facile.

It is still a further object of the invention to enable direct communication between any two control elements of the system without regard to function of said control elements.

SUMMARY DESCRIPTION

A novel telephone switching system is disclosed wherein communication lines, including both local subscriber loops and trunk circuits, are selectively interconnected over a switching network comprising a plurality of modular units, each of which is connected to one of a corresponding plurality of groups of these communications lines. Each network module is equipped with a dedicated stored program control which effects terminal scanning, directory number translation, call supervision, and path selecting and setting functions. The stored program control units for each switching network module are arranged in a load-sharing basis, wherein, under a trouble condition, one module control unit can serve not only its own, but a mate switching network module, as well.

Telephone switching system service circuits, including originating registers, incoming registers, and senders are each equipped with dedicated stored program control with scratch pad memory for call records. These service circuits are terminated at the outlet sides of the switching network modules in multiple patterns providing full access from all network input terminals of all modules.

Switching network module stored program control units and service circuit stored program control units all intercommunicate over asynchronous, serial-by-bit busses to an information exchange unit. The information exchange unit, equipped with its own dedicated stored program control, thus enables communication between any stored program means connected thereto. Additionally the memory units of the information exchange unit include means for storing system routing translation data accessible on demand from any system programmable control unit connected to the information exchange unit. This data is accessed according to dialed digit information stored, for example, in an originating register to yield the module number of the terminal to which a communication path is to be extended. Once the terminating switching network module is determined, then information stored at the network module itself is accessed for translation of dialed digits to a specific terminal number. Hence, the main translation data storage at the information exchange unit is simplified and kept relatively small in physical size.

Each switching module consists of a space division network of the so-called folded type wherein both lines and trunks are terminated at the inlets on one side of the network module. Talk paths consist of a calling terminal through links of the module to an outlet terminal connected to either an intramodule junctor circuit or an intermodule junctor circuit, thence back through other links of the same (intramodule) or a different (intermodule) switching network module to a called terminal.

FEATURES

According to a feature of the invention, system design is such that the highly desirable market characteristic of low per-line cost in the smaller size offices is achieved. Further, systems based on this invention have the capability for accomodating new services and features but, at the same time, do not cost penalize those systems not utilizing said services or features.

According to a further feature of the invention, the information exchange unit is arranged to easily accomodate addition of communication ports on a pluggable basis for facile growth. Additionally, communication between a newly added control element and any of all the existing control elements is easily effected via the programmable information exchange unit with no additional cabling requirements other than that from the newly added unit to an information exchange unit port.

According to yet another feature of the invention, the system control interface to the outside world is provided at ports of the information exchange unit. This includes man-machine interfacing as typically provided by Teletype. Maintenance and administration consoles, locally or remotely provided, likewise gain access to the system at an information exchange unit communication port. Still other service features, such as local automatic message accounting or traffic monitoring, may be added to an office by giving access to such feature-providing units at the information exchange unit.

DRAWING

These and other objects and features of the invention will become apparent from a reading of the following description of an illustrative embodiment of the invention taken in conjunction with the drawing in which FIGS. 1A and 1B, when arranged as shown in FIG. 1C, depict an illustrative embodiment of the system built in accordance with the principles of the invention.

FIG. 2 depicts the switching network module topology suitable for use in accordance with the principles of the invention.

FIGS. 3A, 3B, 3C, and 3D, when arranged as shown in FIG. 3E, depict the functional arrangement of a module control unit suitable for use in accordance with the principles of the invention.

Figure 6:
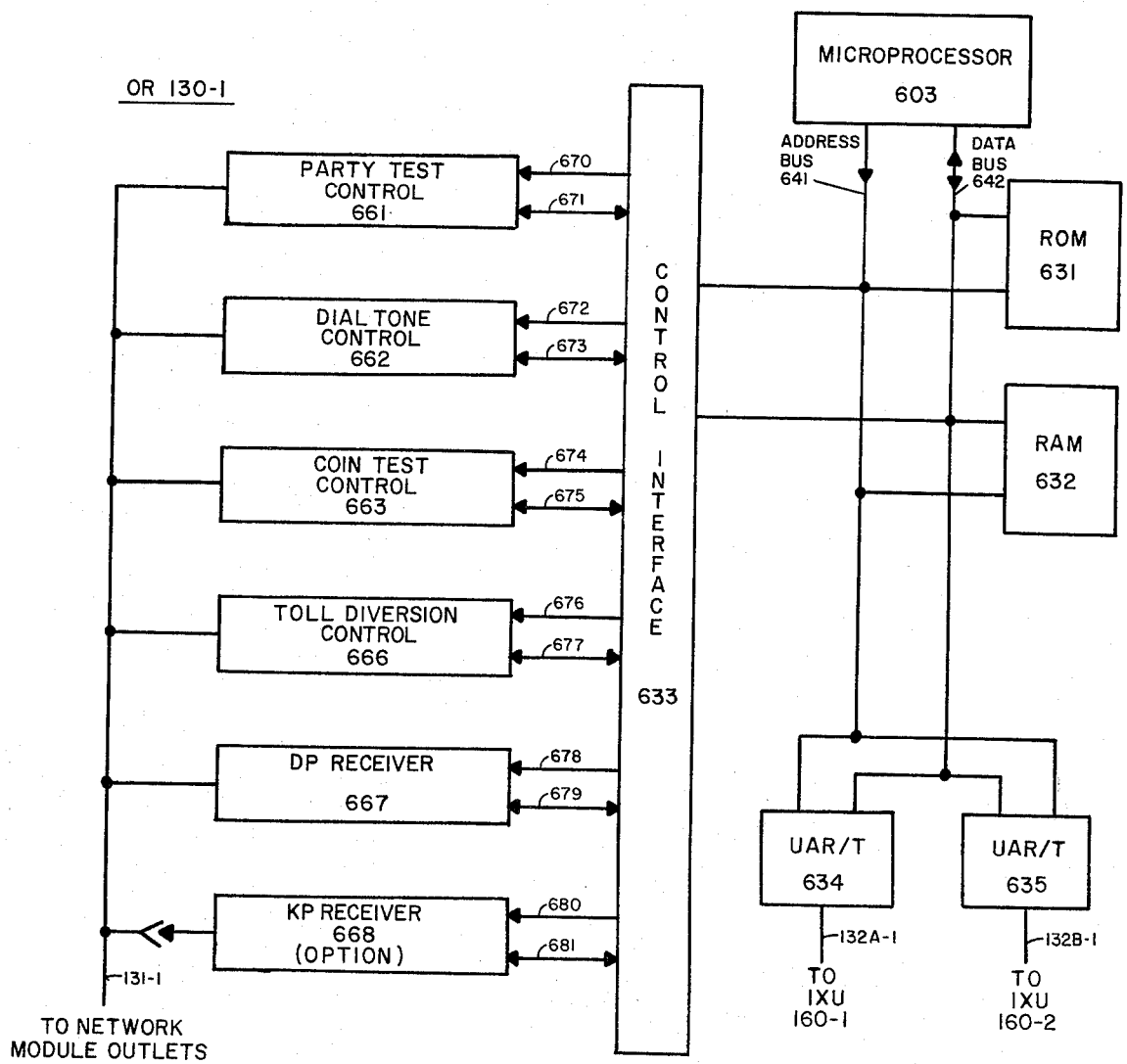
Figure 7:
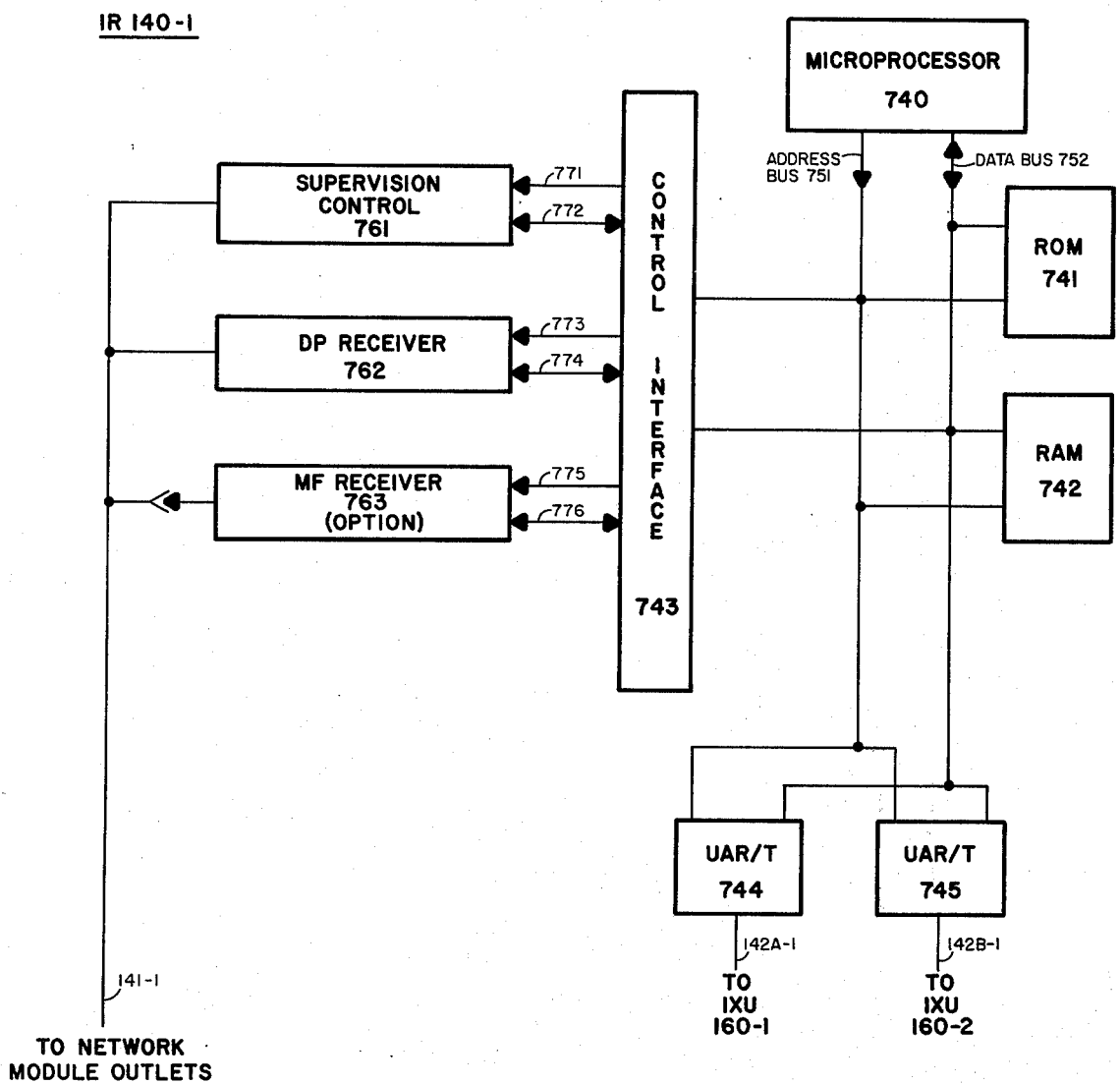

FIGS. 6, 7, and 8 respectively depict the functional arrangements of an originating register, an incoming register, and a sender, each suitable for use in accordance with the principles of the invention.

FIGS. 9, 10, 11A, and 11B depict data formats for serial control messages, line control cards, number group translation data of the office data file, and three digit translation data of the office data file, all formats suitable for use in accordance with the principles of the invention.

Figure 12:
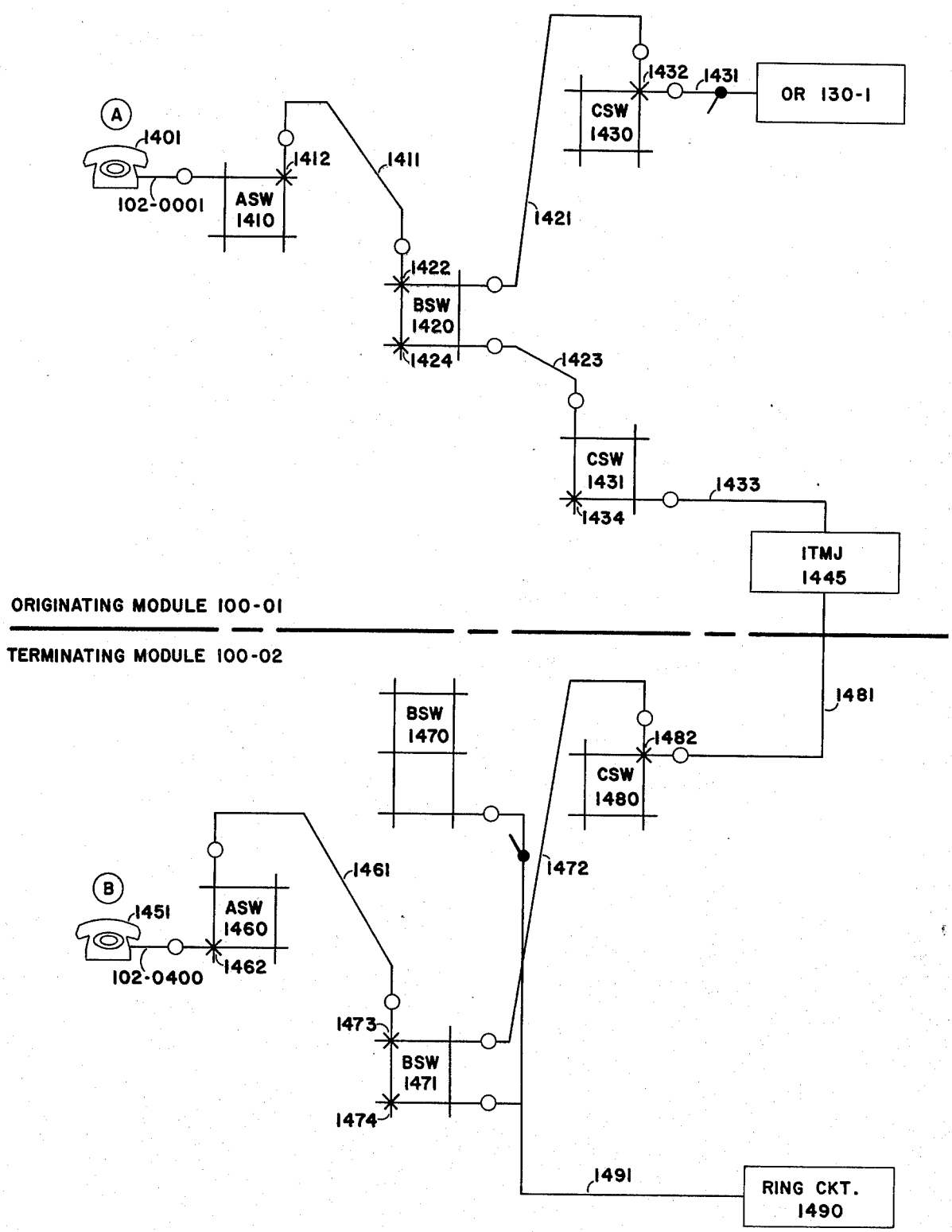
Figure 13:
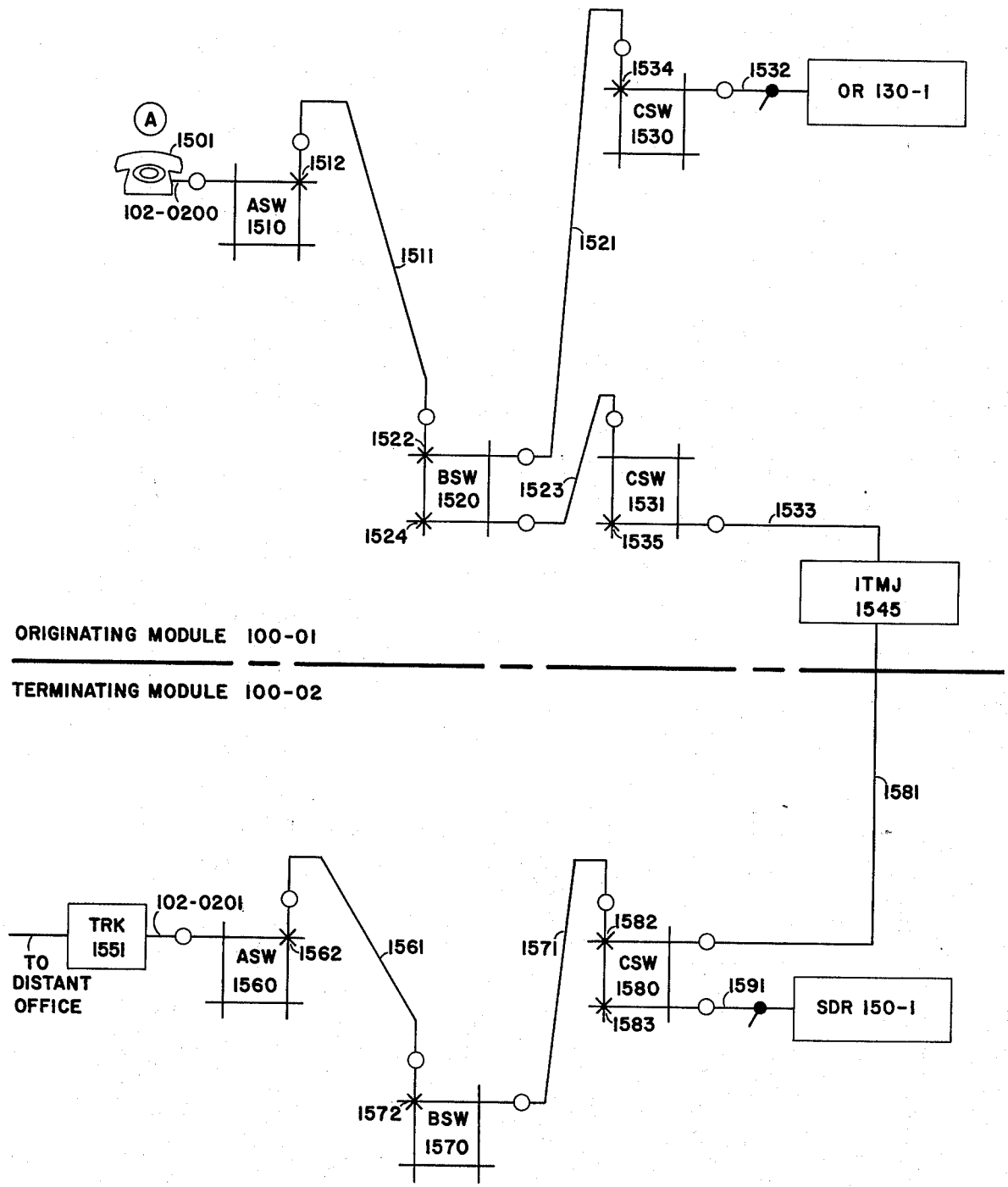

FIG. 12 depicts network connections associated with an example of an intra-office call, and FIG. 13 depicts network connections associated with an example of an interoffice call, both calls processed to completion in accordance with the principles of the invention.

GENERAL SYSTEM DESCRIPTION — FIGS. 1A, 1B, 1C

In order to more fully understand the principles of the invention, an illustrative embodiment will be described which comprises a small modular telephone exchange with distributed programmable control. This use of a telephone exchange as an example embodiment in no way limits the invention, for, as will be obvious to those skilled in the art, the principles to be set forth herein are equally applicable to communication systems in general. Furthermore it should be noted that references to specific component parts of specific manufacture are for sake of example only and do not constitute limitations on the instant invention.

Figure 1A:
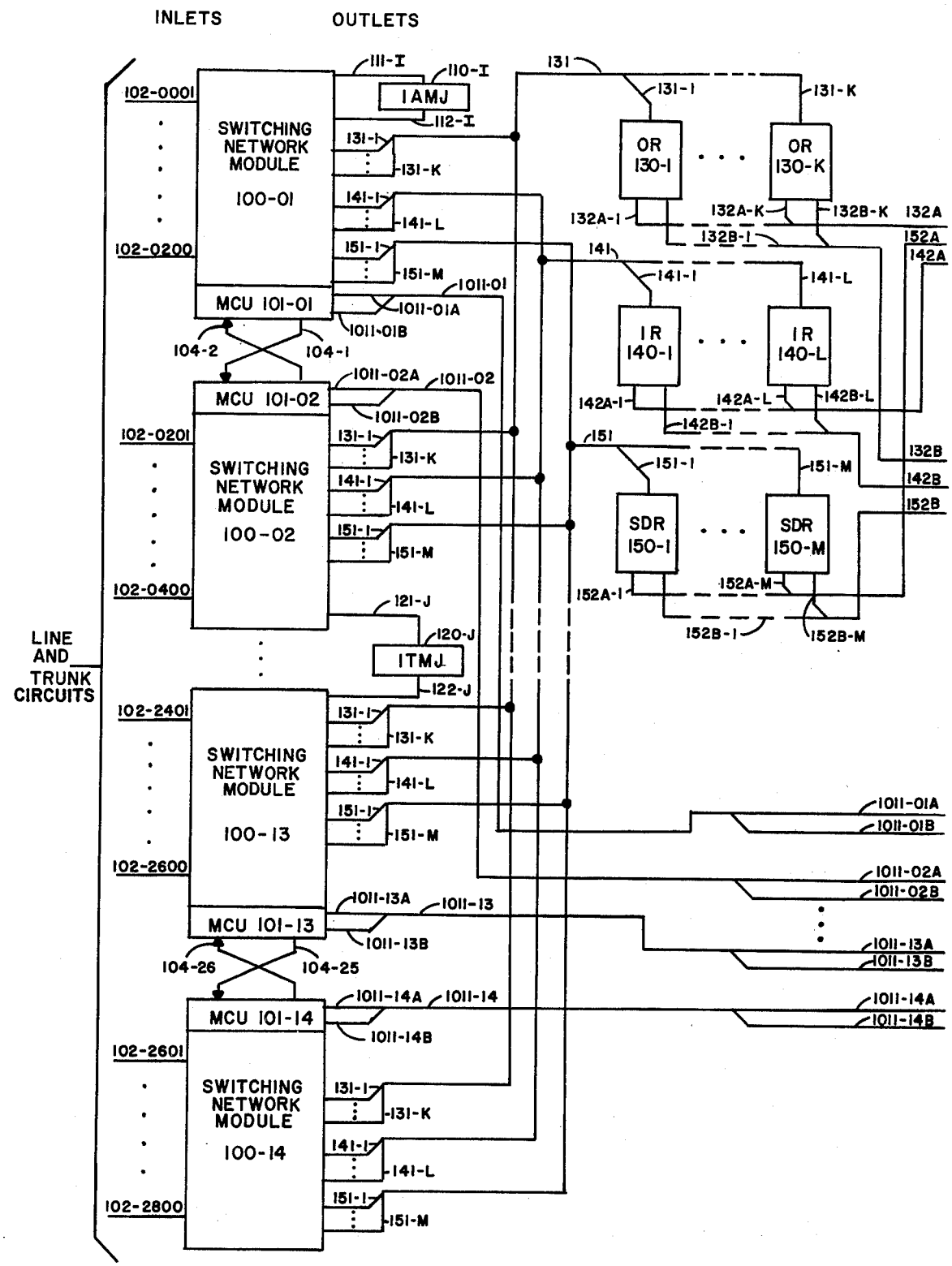
Figure 1B:
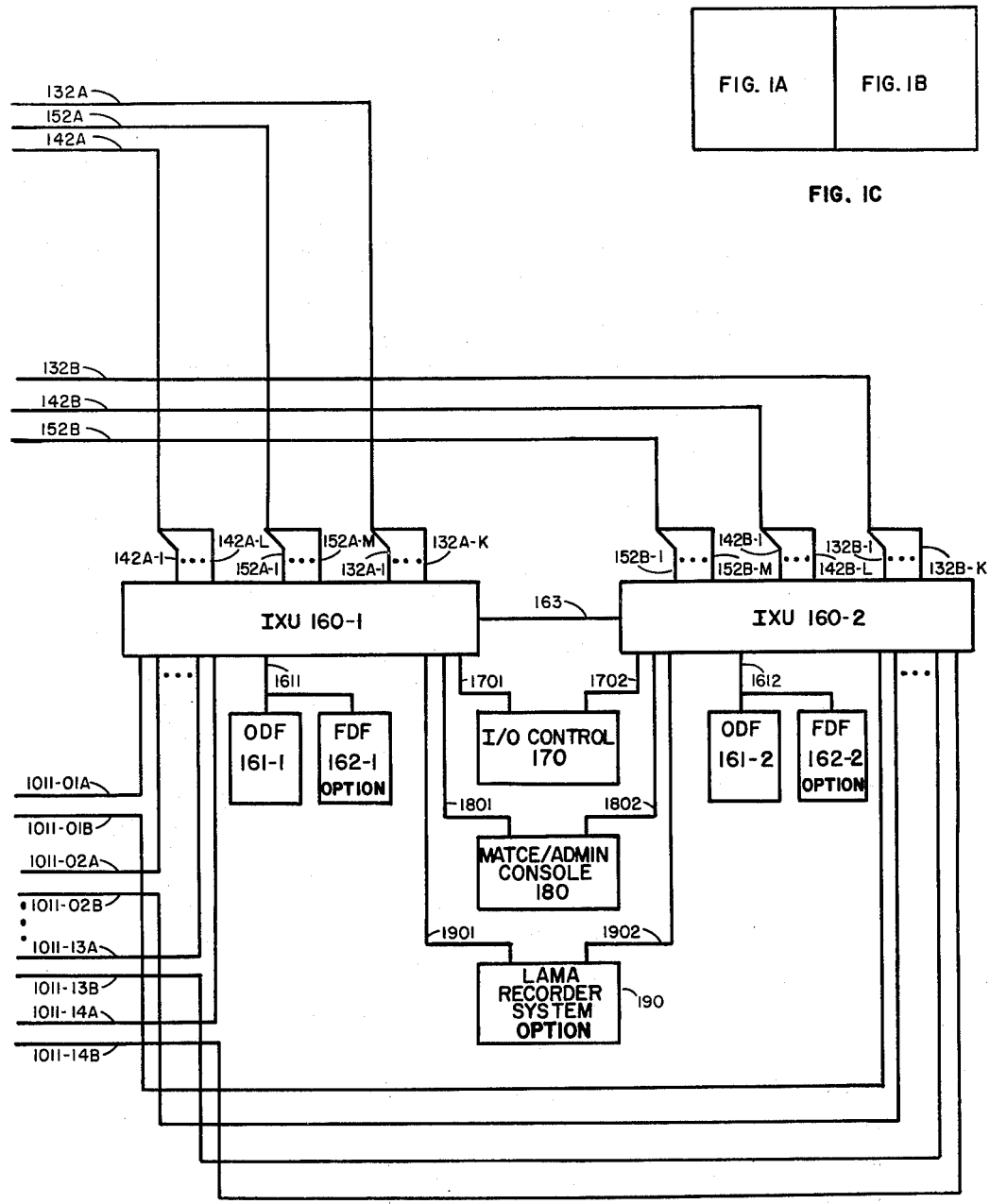

FIGS. 1A and 1B, when arranged as shown in FIG. 1C, set out the basic functional system building blocks and their basic interconnections for the illustrative embodiment. The interconnection paths of the figures of the drawing are shown as single paths, but it should be understood that most, if not all, of these paths represent a plurality of conductors.

The block diagram of FIG. 1A, 1B sets forth the arrangement for the maximum size office for the illustrative embodiment, namely 2800 terminals for lines and trunks divided into groups of 200 terminals, each group served by a switching network module of the space division type. Hence there are a maximum of 14 modules, four of which are shown as switching network modules 100-01, 100-02, 100-13, and 100-14 in the left hand portion of FIG. 1A (modules 100-03 through 100-12 are not explicitly shown). The module inlets, for terminating line and trunk circuits, are labeled 102-0001 through 102-2800. Due to the modularity of the switching network, it is seen that the range of office size runs from a minimum of 200 terminals up to the maximum of 2800 terminals, in steps of 200 terminals. A more detailed discussion of the topology for all switching network modules is presented in a later section of this specification.

From the module arrangement of FIG. 1A, it can be seen that there are two basic types of communication path that can be established between two inlet terminals. The first path type extends from an inlet terminal, through the network switches of the module terminating that inlet, to an outlet connected to an intramodule junctor (IAMJ), through the IAMJ to another outlet on the same switching network module, back through another path through the same switching network module to another inlet terminated on that module. This first type of path shall be designated intramodule connection. An example of such an intramodule connection could be from inlet 102-0001, through a switching path of module 100-01 to an outlet terminating path 111-I to IAMJ 110-I, back to another outlet of module 100-01 via path 112-I, back through another switching path of module 100-01 to inlet 102-0200.

The second path type extends from an inlet terminal, through the network switches of the module terminating that inlet, to an outlet connected to an intermodule junctor (ITMJ), through the ITMJ to an outlet of a different switching network module, back through the switches of said different module to an inlet terminated thereon. This second type of communication path shall be designated an intermodule connection. An example of such an intermodule connection could be from inlet 102-0201, through the switches of module 100-02 to an outlet connected via path 121-J to ITMJ 120-J, back over path 122-J to an outlet of module 100-13, through the switches of module 100-13 to inlet 102-2401.

The term junctor, as used in this specification, refers to an electrical circuit inserted in every speech path of the system for providing functions including battery supply for calling and/or called parties, elements for detecting disconnect by calling and/or called parties, and means for providing, and subsequently removing, audible ringing tone to the calling party. Individual components necessary for providing such telephony functions are well known in the art and, taken by themselves, do not constitute a part of the instant invention.

It should be understood that no restrictions are placed on the assignment of line or trunk circuits to specific module inlets. Hence the communication paths described above could serve as line-to-line, line-to-trunk, or trunk-to-trunk communication switching system connections. Similarly, there are no restrictions as to which module outlets should be connected to IAMJ's or to ITMJ's. Although only one IAMJ and one ITMJ are shown in FIG. 1A, it is to be understood that each module is equipped with a plurality of both junctor types. In the normal situation, at least one ITMJ runs from a given module to every other module of the switching network. The required quantity of each type junctor is traffic dependent, and the dimensioning of such items is accomplished through use of traffic calculation procedures well known to those skilled in the art. Junctor circuits, whether IAMJ or ITMJ, are considered to be an integral part of the system switching network in this specification.

Also seen in FIG. 1A, associated with each switching network module, are module control units (MCU) 101-01 through 101-14. It should be noted that each MCU is arranged in a load-sharing basis with one other adjacent module. For example, MCU 101-01 is also capable of controlling module 100-02 over control path 104-1. Likewise, MCU 101-02 is capable of controlling module 100-01 over control path 104-2. This inter-control arrangement is provided for each MCU pair up through MCU 101-13 and MCU 101-14 which are shown interconnected via control paths 104-25 and 104-26. This arrangement is provided for reliability purposes and does not comprise the normal operating configuration. Under trouble-free conditions, each switching network module is under control of its associated MCU only. Each MCU includes three major functional units (not shown separately in FIG. 1A): a line/trunk control unit, a supervision scanner control unit, and a matrix switch control unit, each having a dedicated microprocessor controller.

Before setting out a general description of the three MCU control elements, a digression into the subject of the above-mentioned microprocessor is in order. The socalled microprocessor is now well-known to those skilled in the art and is the result of efforts by semiconductor manufacturers to utilize the advantage of large scale integration techniques to start an evolution from large, powerful, high cost machines to much smaller low cost machines. Microprocessors have three major characteristics which distinguish them from conventional processors.

1. Microprocessors are fabricated entirely as one integrated circuit or as a small number of such circuits.
2. Microprocessor systems sell for hundreds, rather than thousands of dollars.
3. Microprocessors are relatively slow compared to most minicomputers.

General descriptive information pertaining to microprocessor technology and application may be found in the following:
   a. IEEE Spectrum, Nov. 1972 — "MOS/LSI Launches the Low-Cost Processor"
   b. Electronics, Vol 46, No. 21, Oct. 11, 1973 — "Microprocessors: A New Tool for System Designers"
   c. Electronic Products, Vol. 16, No. 6, Nov. 19, 1973 — "Forum: It's Go for Microprocessors"

Specific examples of microprocessor systems are commercially available from many manufacturers including Intel Corporation, Fairchild Semiconductor, American Micro-systems, Inc., National Semiconductor, Motorola, Raytheon, and Signetics. The microprocessor system components of the illustrative embodiment could, for example, be taken directly from the M6800 system family produced by Motorola Semiconductors. The M6800 family includes an XC6810 random access memory (RAM), an XC6816 read-only memory (ROM), an XC6820 peripheral interface adapter, and an XC6850 asynchronous communications interface adapter for converting between parallel and serial data transfer means.

Returning to the MCU general description, the line/-trunk scanner is implemented with microprocessor control logic and is comprised principally of terminal scan circuits and line and trunk electronic control cards. The scanner normally serves all line and trunk circuits within its own module. However the scanner is also capable of serving an adjoining module's line and trunk circuits. Each electronic line control card serves 20 lines and consists of memory containing not only the current state of the line, as maintained by the scanner, but also originating class mark, terminating class mark, and number group information. In addition, the line control card contains circuitry necessary to control 20 simplified line relay circuits. Similar information is contained on the trunk control card except that one such card serves only five trunk circuits. These cards provide trunk control memory and drivers for specific trunk relay operation. The scan control microprocessor thus provides a form of centralized trunk logic. The scan routine sequentially accesses lines and trunks and compares a current state with a previous state to determine if a response is required. The line/trunk control unit communicates directly (via a DC bus) on an interrupt basis with the matrix control unit when service requests are initiated and number group or class mark data is to be transmitted.

The supervision scanner unit of the MCU is also controlled via a dedicated microprocessor. Its function is to continuously scan network link control leads and to maintain a link status memory in a manner providing capability for disconnect supervision and path search analysis. An additional status memory is maintained here for proper selection of idle junctor circuits connected to the network module served by the supervision scanner unit. Disconnect conditions are detected and processed, and the resulting switching network information is transmitted over a DC bus to the matrix control unit. A connect request from the matrix control unit initiates the supervision scan controller's path search routine resulting in path information being returned to the matrix control unit over the same DC bus. The supervision scanner is also capable of serving an adjacent switching network module.

The matrix control unit is also implemented using a dedicated microprocessor system. This unit provides the means for sending and receiving control information to and from other control elements of the switching system. The local functions of each matrix controller are classical marker functions which include setting up and releasing connections through the associated switching network module. The matrix control unit is also capable of serving an adjacent switching network module.

Cooperative actions among the three main functional components of each MCU are covered in greater detail in a later section of this specification.

Also seen in the system diagram of FIG. 1A, 1B are three separate pools of service circuits. The term "service circuit", as used in this specification, refers to a system element which serves, or responds to requests from lines or trunks for establishment of communication paths, or which responds to requests from internal system control units for forwarding of information to distant switching facilities. The system of the illustrative embodiment employs three distinct types of service circuits: originating registers serve requests for action from local lines, incoming registers serve requests for action from incoming trunks, and senders serve requests for transmittal of data to distant communication switching facilities. Originating registers are designated OR 130-1 through 130-K, incoming registers are designated IR 140-1 through 140-L, and senders are designated SDR 150-1 through 150-M. K, L, and M are integers whose values are chosen according to traffic principles well known in the art.

As shown in FIG. 1A, each service circuit of each pool has at least one appearance at the outlet side of each switching network module. These appearances are represented by paths 131-1 through 131-K for OR's, 141-1 through 141-L for IR's, and 151-1 through 151-M for SDR's. The exact number of module outlet appearances per device is a function of both traffic requirements and call processing strategy. The relationship to call strategy will be shown in later descriptions of example calls processed by the switching system.

Each originating register (OR) is comprised of two main functional parts (not shown separately in FIG. 1A). One part is comprised of digit receiving circuits, party test circuits, coin control circuits, and dial tone application circuits. The other part is comprised of the logic necessary to control the above circuitry and is implemented in a dedicated microprocessor system. The microprocessor has provisions to establish a software call record, perform digit registration and analysis and provide required timing functions such as interdigital timing control. The register can also transmit or receive various control messages destined for, or originating from, any other control entity in the system.

Each incoming register (IR), similar to the OR, also is comprised of two major functional parts (not separately shown in FIG. 1A), digit receiving and supervisory control circuits, and a microprocessor controller. The receiving circuits are designed to accept trunk signaling information rather than customer - generated digits. The IR does not contain circuits for such functions as party test or coin control. However the call handling logic of the control section is very similar to that of the OR. The IR has provisions for maintaining a software call record and for communicating with all other control entities in the system.

Each sender (SDR), like the registers, is comprised of two major functional parts (not shown separately in FIG. 1A). One part is the trunk signaling and supervision circuits which directly interface with trunk circuits through links of the switching network. The other major part is the sender control which is microprocessor-implemented logic. The trunk signalling and supervision circuits, together with their microprocessor control, comprise one SDR unit which is dedicated to serving only one call throughout a sending task.

A means providing for intercommunication among system control elements is shown in FIG. 1B in the form of two information exchange units, IXU 160-1 and IXU 160-2. Because of low control data transfer rate requirements in smaller sized offices served by the system of the invention, the intercommunication function among system control units is implemented via low-speed, serial-by-bit, asynchronously operating busses between control units and IXU's. Hence serial messages can be routed between any two control elements, regardless of either's function, by using store and forward techniques at the IXU.

Both IXU's 160-1 and 160-2 are provided for reliability purposes. One IXU is on-line and the other is on standby status. IXU 160-1 and IXU 160-2 intercommunicate (also serially) via path 163. All service circuits and module control units are equipped with serial communication busses to each IXU. MCU's 101-01 through 101-14 communicate with IXU 160-1 over paths 1011-01A through 1011-14A, respectively. MCU's 101-01 through 101-14 communicate with IXU 160-2 over paths 1011-01B through 1011-14B, respectively. OR's 130-1 through 130-K communicate with IXU 160-1 over paths 132A-1 through 132A-K, respectively, and with IXU 160-2 over paths 132B-1 through 132B-K, respectively. IR's 140-1 through 140-L communicate with IXU 160-1 over paths 142A-1 through 142A-L, respectively, and with IXU 160-2 over paths 142B-1 through 142B-L, respectively. SDR's 150-1 through 150-M communicate with IXU 160-1 over paths 152A-1 through 152A-M, respectively, and with IXU 160-2 over paths 152B-1 through 152B-M, respectively.

Both ends of each of the above serial communication paths are equipped with universal asynchronous receiver/transmitter (UAR/T) devices. The UAR/T is a general purpose, programmable MOS/LSI device for interfacing an asynchronous serial data bus of a peripheral terminal with parallel data of a computer. Each pair of busses, one for transmit and one for receive, between a system control unit and an IXU is terminated on either end by a UAR/T device. All store and forward functions of the IXU are accomplished through microprocessor control logic. The IXU and the UAR/T are discussed in more detail in later sections of this specification.

The central source of basic system translation information is maintained in a fully duplicated solid state random access memory (RAM) known as the office data file (ODF). As shown in FIG. 1B, ODF 161-1 is accessed over busses 1611 by IXU 160-1, while duplicate ODF 161-2 is accessed over busses 1612 by IXU 160-2. Optional feature data is maintained in a duplicated RAM known as the feature data file (FDF) which may be optionally provided on a pluggable basis. FDF 162-1 is accessed over busses 1611 by IXU 160-1, while duplicate FDF 162-2 is accessed over busses 1612 by IXU 160-2.

Dialed digits are used by subroutines in the IXU microprocessor to properly access the ODF to determine which switching network module should terminate a given call. More detailed translation information (such as directory number to terminal number conversion) is then obtained at a later time during call processing at the terminating module through use of information stored on line/trunk control cards.

The FDF basically provides an optional storage area for handling such things as exotic features (abbreviated dialing repertoires, call forwarding numbers, etc.). The FDF is accessed according to class mark information found at the switching network module line/trunk control cards.

Hence, in summary, office data may be stored in several different locations. Data peculiar to a given line or trunk are stored directly on the control cards in each module. Cases requiring additional class markings indicate that further information is stored in the FDF. This scheme provides for any number of class marks required to meet a particular need. Basic routing data are maintained in the ODF and are used in conjunction with that data stored at the switching network modules. This distributed, modular implementation of office data results in a low base cost for the small office memory and reduces the data transfer rate requirements.

The system IXU's 160-1 and 160-2 serve as interface points to any external devices or subsystems wishing to gain access to the communication switching system. For example, as shown in FIG. 1B, input/output control 170 accesses the system over bus 1701 to IXU 160-1 and over bus 1702 to IXU 160-2. Man-machine interface (usually by teletype) means would, in turn, be connected to I/O control 170. Likewise a maintenance and administration console 180 is shown accessing IXU 160-1 over bus 1801 and over bus 1802 to IXU 160-2. Such a console is either locally or remotely provided — the point being that console access to the system is via the IXU. Any additional optional subsystems also access the switching system via IXU's 160-1 and 160-2. For example, FIG. 1B shows a local automatic message accounting system 190 accessing the system over bus 1901 to IXU 160-1 and over bus 1902 to IXU 160-2. Busses 1701, 1702, 1801, 1802, 1901 and 1902 are also serial and equipped at both ends with the aforementioned UAR/T devices.

SWITCHING NETWORK TOPOLOGY — FIG. 2

Figure 2:
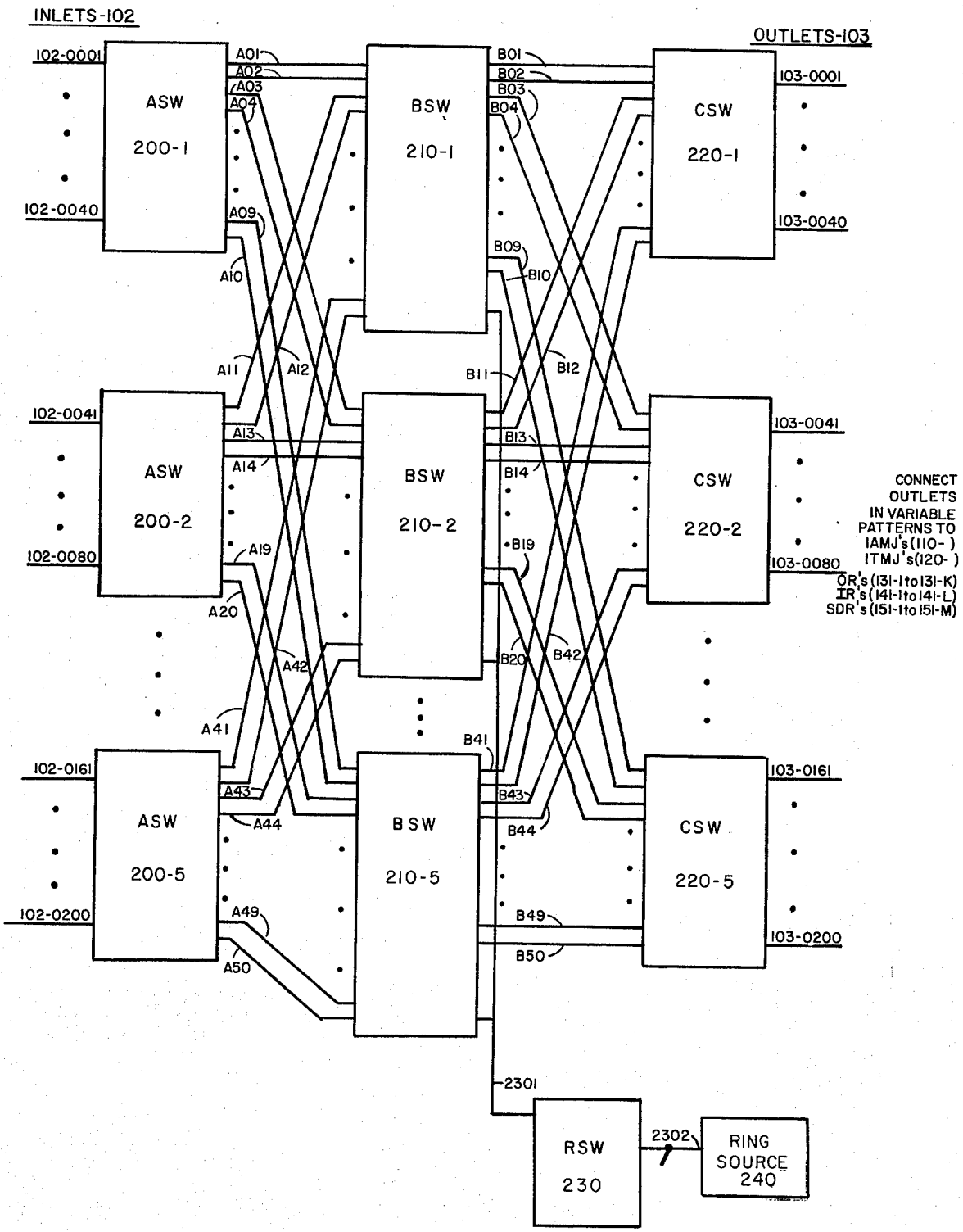

The general description discussed system line and trunk terminals interconnected over at least one switching network module as depicted in FIG. 1A. An expanded view of module 100-01 of FIG. 1A is shown in FIG. 2. The basic module is comprised of a three-stage folded space division network with five network matrix switches in each stage. All switching network modules have the same topology as that shown for module 100-01 in FIG. 2.

All matrix switches of the illustrative embodiment are crossbar switch arrangements known as code switches. An arrangement of this kind is mainly characterized by a number of connecting magnets with associated armatures, mounted in a row on a common mounting plate, and by a code system comprising bars disposed lengthwise along the connecting relays, which bars at one lengthwise edge are provided with grooves into which lifting rockers may engage. The rockers selected by the code system are then lifted by the armature and actuate the associated contacts of a multiple. The basic mechanisms and principles of operation of this type switching device are disclosed in U.S. Pat. No. 3,060,274 issued Oct. 23, 1962, to Alexandersson, U.S. Pat. No. 3,089,011 issued May 7, 1963, to Alexandersson, and U.S. Pat. No. 3,096,422 issued July 2, 1963, to Alexandersson et al. A detailed review of code switch construction and operation is found in the Ericsson Review, Vol. 41, No. 3, 1964, pages 80–87.

For the illustrative embodiment, each network switch is arranged to provide a 10×40 array, or 400 crosspoints. The first stage of switching has 40 inlets and 10 outlets per switch, while the second and third stages of switching each have 10 inlets and 40 outlets per switch ("inlets" and "outlets" are merely defined by the manner in which a particular switch is wired). Each switch crosspoint comprises four metallic contacts for switching four conductors through the network, two for the speech path, and two for path search and disconnect supervisory functions.

Returning to FIG. 2, module inlets 102-0001 through 102-0200 terminate on the first, or A, stage switches (ASW) 200-1 through 200-5, 40 inlets to a switch. These inlets are connected on the left side to lines and trunks entering the switching system. The outlets of each ASW are distributed to the inlets of the second, or B, stage switches (BSW) 210-1 through 210-5, over A-links A01 through A50, with two A-links of each ASW running to each BSW. (It should be noted that each interstage path shown in FIG. 2 actually represents four separate conductors.) Hence each BSW has inlets accepting 10 A-links. Although this is a 4:1 concentration ratio, the ASW arrangement has traffic characteristics of a 40:10 full-access concentrator.

Each BSW, 210-1 through 210-5, has 40 outlets. However, only 10 of the outlets on each BSW are used for B-link connections B01 through B50 to the third, or C, stage switches (CSW) 220-1 through 220-5. The remaining 30 outlets of each BSW are used for connections to such things as ringing circuit multiples, tone and announcement sources, and coin control circuits. For example, in FIG. 2, one such ringing circuit multiple 2301 is shown terminating at one outlet of each BSW while terminating at its other end in ringing select switch 230.

The first 10 outlets of each BSW are distributed over the inlets of the five CSW's via B-links B01 through B50, with two B-links from each BSW running to each CSW. Hence each CSW has inlets accepting ten B-links. Each CSW has 40 outlets for a total of 200 module outlets, 103-0001 through 103-0200. As previously seen in a discussion of FIG. 1A, these outlets are connected in variable patterns to intramodule junctors, intermodule junctors, and service circuits.

To summarize the network topology, the switching network of each module is comprised of 15 code switches and provides 200 inlets with 200 outlets and 50 links between stages.

MODULE CONTROL UNIT FIGS. 3A, 3B, 3C, 3D, 3E

The previous discussion of FIG. 1A included reference to module control units (MCU) associated with each switching network module, each MCU also capable of controlling a neighboring module. Two such module control units are now discussed in more detail. FIGS. 3A through 3D, when arranged as shown in FIG. 3E, set out the functional components and their interconnections comprising the two MCU's (101-01 and 101-02) associated with modules 100-01 and 100-02 of FIG. 1A.

Figure 3C:
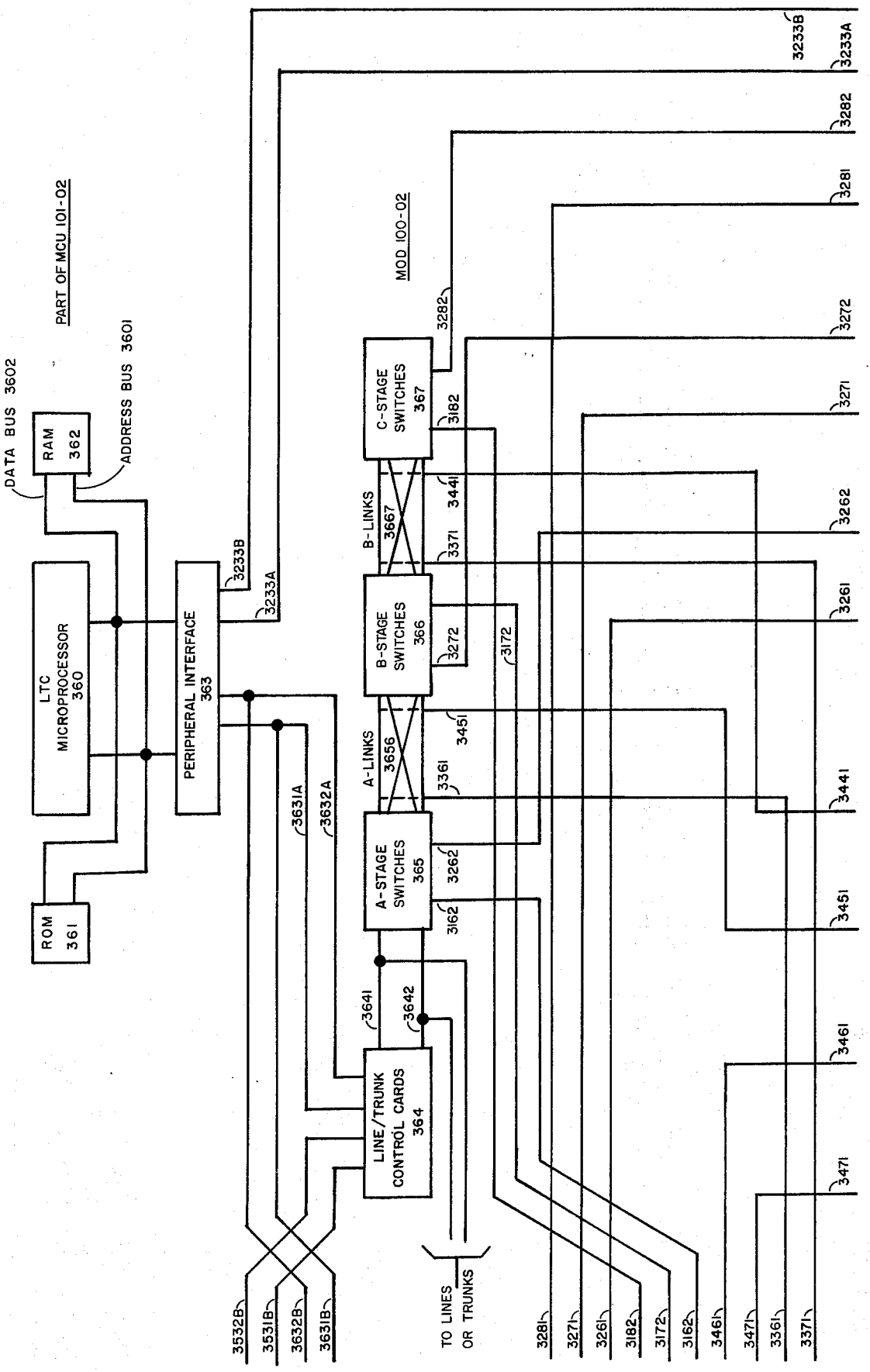
Figure 3D:
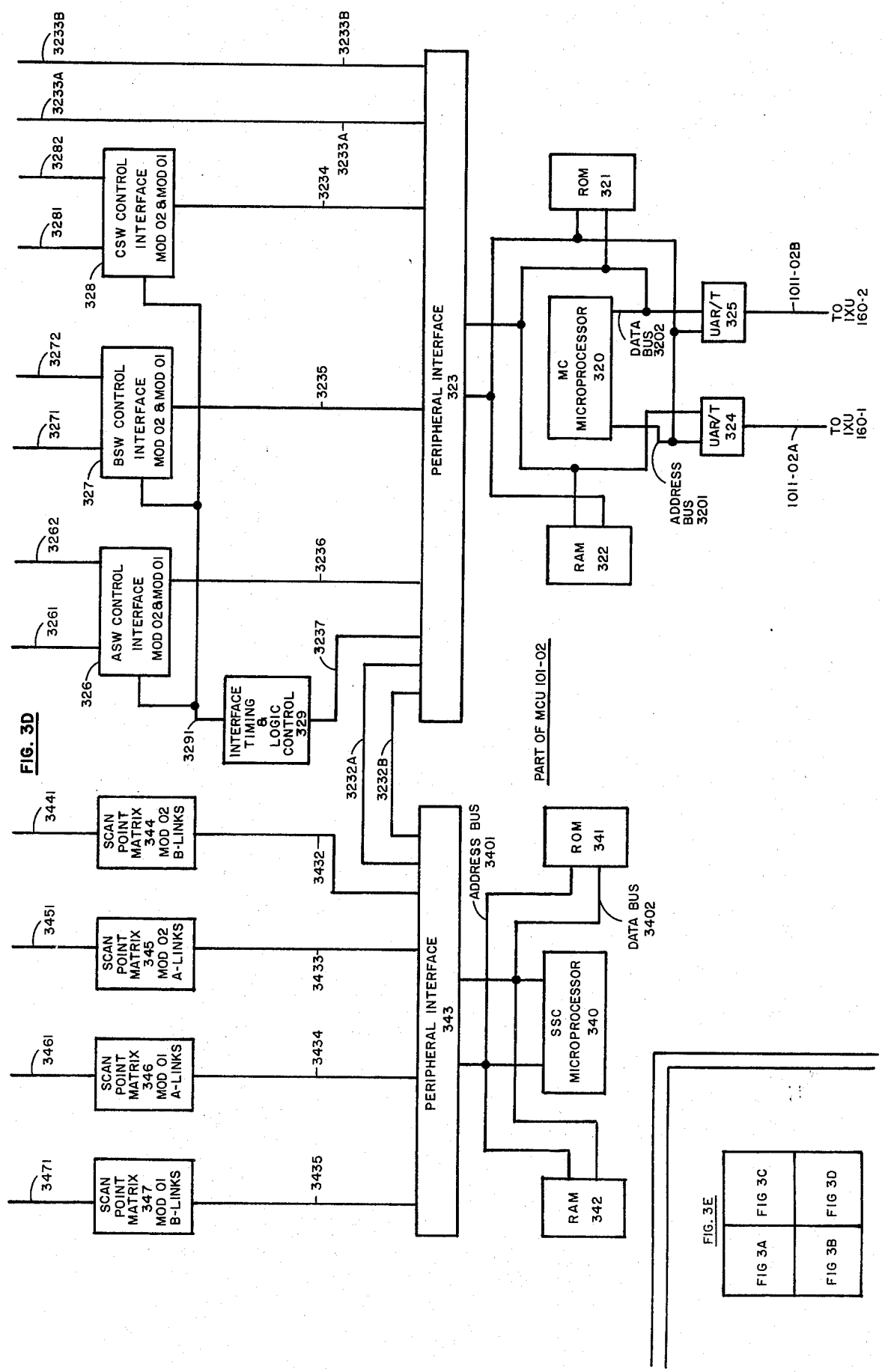

MCU 101-01, shown on FIGS. 3A and 3B, is comprised of a matrix control (MC) subsystem centered around MC microprocessor 310, a supervisory scan control (SSC) subsystem centered around SSC microprocessor 330, and a line/trunk control (LTC) subsystem centered around LTC microprocessor 350. In its normal operating mode, MCU 101-01 controls switching network module 100-01, whose functional diagram is shown in FIG. 3A. The mate module, 100-02, is shown in FIG. 3C, and its associated MCU 101-02 is shown distributed over FIGS. 3C and 3D, where the MC microprocessor 320, SSC microprocessor 340, and LTC microprocessor 360 are the central functional elements.

MC microprocessor 310 has access to a program store ROM 311, a temporary store RAM 312, a peripheral interface unit 313, and UAR/T's 314 and 315, all access provided over 16-bit parallel address bus 3101 and 8-bit parallel data bus 3102. Of the three MCU microprocessors, the MC microprocessor is the only one having UAR/T access to the two system IXU units 160-1 and 160-2 (FIG. 1B). This access is via serial busses 1011-01A and 1011-01B.

The peripheral interface (PI) 313 (comprised, for example, of previously referenced Motorola XC6820 units) provides communication access to the LTC subsystem over control path 3133A and data path 3133B, and to the SSC subsystem over control path 3132A and data path 3132B. Paths 3133A, 3133B, 3132A, and 3132B are each 8-bit parallel busses. PI 313 also provides access from MC 310 to the code switch control hardware comprised of A-stage switch (ASW) control interface 316, B-stage switch (BSW) control interface 317, C-stage switch (CSW) control interface 318, and the interface timing and logic control unit 319.

ASW, BSW, and CSW control interface elements 316, 317, and 318, when timed and controlled by logic control unit 319, provide standard code switch control circuits. Units 316, 317, and 318 could, for example, comprise VMR devices described in cooperation with a controlling set of central processors as part of U.S. Pat. No. 3,503,048 issued Mar. 24, 1970, to Avsan et al. Unit 319 could comprise, for example, a VMR-C, a logic timing and control circuit also described in U.S. Pat. No. 3,503,048. Signal distribution points associated with a VMR switch controller referred to in U.S. Pat. No. 3,503,408 are utilized in the instant invention but are controlled by an MC microprocessor rather than by a central processing unit. A total of 16 bits of parallel information is sent to a code switch control interface to effect crosspoint operation; 4 bits select 1 of 10 verticals, 5 bits select a specific code switch, 6 bits select a combination of code bar positions, and 1 bit is used as an end-of-cycle indication.

The switch control interfaces of the illustrative embodiment assume the form of the above VMR-type circuit for the sake of example only. Any suitable relay logic set with interface relay drivers and with appropriate sequencing would be applicable. The general sequence required for code switch crosspoint closure is 1. select and operate code bar selection magnets
2. select and operate vertical magnet to lock rocker arms controlling crosspoint contacts
3. release vertical magnet, leaving rocker arm in operated position
4. release code bar selection magnets.

The rocker arms selected by the above sequence are mechanically latched until a subsequent operation of the associated vertical magnet. To summarize, the elements 316, 317, and 318 may be thought of as relay drivers and relay logic trees, gated and timed by element 319 to effect code switch crosspoint operation in the switching network module.

MC 310 of MCU 101-01 thus directs the control of A-stage network switches by forwarding the appropriate instruction over data bus 3102, through PI 313, over control path 316 to ASW control interface 316 and over control path 3137 to logic control 319. Logic control 319 presents timing signals to ASW control interface 316 over control path 3191 whereupon control signals are gated either to one of five module 100-01 A-stage switches 355 over control path 3161 (normal mode), or to one of five module 100-02 A-stage switches 365 over control paath 3162 (load sharing or trouble condition mode).

MC 310 directs the control of B-stage network switches by forwarding the appropriate instruction over data bus 3102, through PI 313, over control path 3135 to BSW control interface 317 and over control path 3137 to logic control 319. Logic control 319 presents timing signals to BSW control interface 317 over control path 3191 whereupon control signals are gated either to one of five module 100-01 B-stage switches 356 over control path 3171 (normal mode) or to one of five module 100-02 B-stage switches 366 over control path 3172 (load sharing or trouble condition mode).

Similarly, MC 310 directs the control of C-stage network switches by forwarding the appropriate instruction over data bus 3102, through PI 313, over control path 3134 to CSW control interface 318 and over control path 3137 to logic control 319. Logic control 319 presents timing signals to CSW control interface 318 over control path 3191 whereupon control signals are gated either to one of five module 100-01 C-stage switches 357 over control path 3181 (normal mode) or to one of five module 100-02 C-stage switches 367 over control path 3182 (load sharing or trouble condition mode).

The SSC microprocessor 330 of MCU 101-01 effects continuous supervisory scanning of the links in either switching network module 100-01 or 100-02 according to a program stored in ROM 331. Status memory and other temporary storage functions are realized using RAM 332. RAM 332 also contains a busy/idle status map for the junctor circuits connected to module 100-01. This map is consulted by SSC 330 in selecting an idle junctor circuit of the required type during the course of call processing. ROM 331, RAM 332, and PI 333 are accessed by SSC 330 over 16-bit parallel address bus 3301, and 8-bit parallel data bus 3302.

Two scan points are associated with each A-link path and with each B-link path in a switching network module. These points monitor the two control leads that are switched through the four-contact switch crosspoints along with the two-wire talk path. Recalling the network topology description; there are 50 A-links and 50 B-links per network module. Hence, since there are two scan points per link, supervisory scan elements are organized into blocks of 100 each, associated with a set of A-links or B-links of a particular switching network module. These scan point matrices are accessed via PI 333, over control paths 3332, 3333, 3334, and 3335 to scan point matrices 334, 335, 336, and 337, respectively.

Matrix 334 has scan points connected over path 3341 to the 100 control leads associated with B-links 3567 of module 100-01. Matrix 335 has scan points connected over path 3351 to the 100 control leads associated with A-links 3556 of module 100-01. Matrix 336 has scan points connected over path 3361 to the 100 control leads associated with A-links 3656 of module 100-02. Matrix 337 has scan points connected over path 3371 to the 100 control leads associated with B-links 3667 of module 100-02. The dotted lines shown (for example, at the terminus of path 3391) represent the distributed connections of 100 scan points to the 100 control leads associated with a particular set of A or B links. This same interpretation should be given to all dotted lines shown in both module 100-01 of FIG. 3A and module 100-02 of FIG. 3C.

Although scan points are provided to the links of module 100-02, these scan point matrices 336 and 337 are used by SSC 330 only in the load sharing or trouble condition mode. In the normal mode, only the links of module 100-01 are scanned by SSC 330.

Using the continuous monitoring of the above scan points, SSC microprocessor 330, in conjunction with programs stored in ROM 331, performs path search and disconnect functions on request from MC microprocessor 310. Since the SSC microprocessor 330 continuously updates the link status memory in RAM 332, the content of the memory is a true representation of current network conditions. Hence path analysis can be performed immediately using the status memory without necessitating directed scans.

Individual scan points may comprise the resistordiode scan point arrangement described at column 20 of U.S. Pat. No. 3,558,829 issued Jan. 26, 1971, to Aro et al. However, other types of scan points known in the art may be used without departing from the spirit and scope of the invention.

The LTC microprocessor 350 of MCU 101-01 effects the direction and supervision of line/trunk control cards 354 of module 100-01 (normal mode) and cards 364 of module 100-02 (load sharing or trouble condition mode), according to programs stored in ROM 351. RAM 352 is used for task records and various other temporary storage such as the recording of hit timing lists for line or trunk terminals requesting service. PI 353 provides microprocessor access to line/trunk control cards and to MC microprocessor 310. There are a maximum of ten line/trunk cards per module. Each card serves either 20 lines or 5 trunks. Each line control card is comprised of line scan points and memory for line status, originating and terminating class marks, and number group information. In addition, each line control card contains driver circuitry necessary to control 20 simplified line relay circuits. Trunk control cards contain memory for class marks and status and circuitry for controlling trunk relay operation.

The scan routine of LTC microprocessor 350 sequentially accesses line and trunk circuits and compares a current state with the previous state to determine what response, if any, is required. During the scan procedure, terminal numbers for network module inlets are determined, for use during subsequent call processing, from an address counter. Also during the scan procedure, the scanning routine has the capability for data searching the number group storage associated with lines. Directory numbers are converted to terminal numbers by using this scan-until-match technique in conjunction with the previously mentioned address counter. The LTC microprocessor also has a scanning routine for incoming trunks with immediate dialing from distant step-by-step offices wherein the first incoming dial pulse may be stored at the LTC RAM for later transfer to an incoming register. This technique prevents lost digits during the connection process to an IR.

LTC microprocessor 350 communicates with MC microprocessor 310 by addressing PI 353, thence over control bus 3133A and data bus 3133B. These busses effect passage of service requests and associated call data between LTC and MC subsystems of MCU 101-01. LTC microprocessor 350 accesses ROM 351, RAM 352, and PI 353 through use of 16-bit parallel address bus 3501 and 8-bit parallel data bus 3502.

The line/trunk control cards 354 of module 100-01 are accessed by LTC microprocessor 350 (in the normal mode) via PI 353 over control path 3531A and data path 3532A, while the line/trunk control cards 364 of module 100-02 are accessed via PI 353 (in the load sharing or trouble condition mode) over control path 3531B and data path 3532B. The elements of the line/trunk control cards comprising line and trunk control circuits are connected to the switching network module inlets. Four examples of such connections are paths 3541 and 3542 between cards 354 and A-stage switches 355 of module 100-01, and paths 3641 and 3642 between cards 364 and A-stage switches 365 of module 100-02.

The three major subsystems of MCU 101-02 function in a manner equivalent to the above description of the corresponding cooperative elements of MCU 101-01.

MC microprocessor 320 uses address bus 3201 and data bus 3202 to access ROM 321, RAM 322, PI 323, and UAR/T's 324 and 325.

A-stage network switches are controlled via PI 323, over control path 3236 to ASW control interface 326 and over control path 3237 to logic control 329. Logic control 329 presents timing signals to ASW control interface 326 over control path 3291 whereupon control signals are gated either to one of five module 100-02 A-stage switches 365 over control path 3262 (normal mode), or to one of five module 100-01 A-stage switches 355 over control path 3261 (load sharing or trouble condition mode).

B-stage network switches are controlled via PI 323, over control path 3235 to BSW control interface 327 and over control path 3237 to logic control 329. Logic control 329 presents timing signals to BSW control interface 327 over control path 3291 whereupon control signals are gated either to one of five module 100-02 B-stage switches 366 over control path 3272 (normal mode) or to one of five module 100-01 B-stage switches 356 over control path 3271 (load sharing or trouble condition mode).

C-stage network switches are controlled via PI 323, over control path 3234 to CSW control interface 328 and over control path 3237 to logic control 329. Logic control 329 presents timing signals to CSW control interface 328 over control path 3291 whereupon control signals are gated either to one of five module 100-02 C-stage switches over control path 3282 (normal mode), or to one of five module 100-01 C-stage switches 357 over control path 3281 (load sharing or trouble condition mode).

The SSC function of MCU 101-02 is performed by SSC microprocessor 340 which accesses ROM 341, RAM 342, and PI 343 over address bus 3401 and data bus 3402. Scan points are accessed via PI 343, over control paths 3432, 3433, 3434, and 3435 to scan point matrices 344, 345, 346, and 347, respectively. Matrix 344 has 100 scan points connected over path 3441 to the 100 control leads associated with B-links 3667 of module 100-02. Matrix 345 has 100 scan points connected over path 3451 to the 100 control leads associated with A-links 3656 of module 100-02. Matrix 346 has 100 scan points connected over path 3461 to the 100 control leads associated with A-links 3556 of module 100-01. Matrix 347 has 100 scan points connected over path 3471 to the 100 control leads associated with B-links 3567 of module 100-01. Again, the normal operating mode is to scan only those links of the home module, in this case module 100-02.

The LTC function of MCU 101-02 is performed by LTC microprocessor 360 which accesses ROM 361, RAM 362, and PI 363 over address bus 3601 and data bus 3602. LTC microprocessor 360 communicates with MC microprocessor 320 by addressing PI 363, thence over control bus 3233A and data bus 3233B.

The line/trunk control cards 364 of module 100-02 are accessed by LTC microprocessor 360 (in the normal mode) over control path 3631A and data path 3632A, while the line/trunk cards 354 of module 100-01 are accessed by LTC microprocessor 360 (in the load sharing or trouble condition mode) over control path 3631B and data path 3632B.

The functional building blocks of MCU 101-01 and MCU 101-02 have been presented and have shown a basically symmetrical arrangement wherein, under abnormal conditions, MCU 101-01 can control both home module 100-01 and mate module 100-02. Likewise, MCU 101-02 can control home module 100-02 and mate module 100-01. This cross-coupling arrangement is shown in FIG. 1A by paths 104-1 and 104-2. It is seen from FIGS. 3A – 3D that path 104-1 of FIG. 1A is represented in more detail in FIGS. 3A – 3D by paths 3162, 3172, 3182, 3361, 3371, 3531B, and 3532B. Similarly, path 104-2 of FIG. 1A is represented in more detail in FIGS. 3A – 3D by paths 3261, 3271, 3281, 3461, 3471, 3631B, and 3632B.

The functional descriptions of this section apply to all pairs of module control units of the system. It should be remembered, however, that the load-sharing arrangement is provided for reliability purposes only, and this arrangement is not necessary for the implementation of autonomous control functions within each switching network module.

INFORMATION EXCHANGE UNIT — FIG. 4

Although in principle it would be possible to accomplish the control information transfer function in the system by providing a serial bus between all pairs of control units, in practice such an approach would be uneconomical. A much less expensive arrangement, used in the illustrative embodiment of the invention, brings the data busses from the various control units into a central information exchange unit (IXU) which can then store and forward messages between any two communicating control units. Each pair of busses, one for transmitting and one for receiving, between a control unit and the IXU is terminated on both ends by UAR/T devices, which are described in more detail in the next section of the specification. All store and forward functions are accomplished through use of microprocessor control. The number of IXU communication ports is provided in modular units for ease of office expansion and for the possible addition of any new devices requiring communication access to the system control elements.

Figure 4:
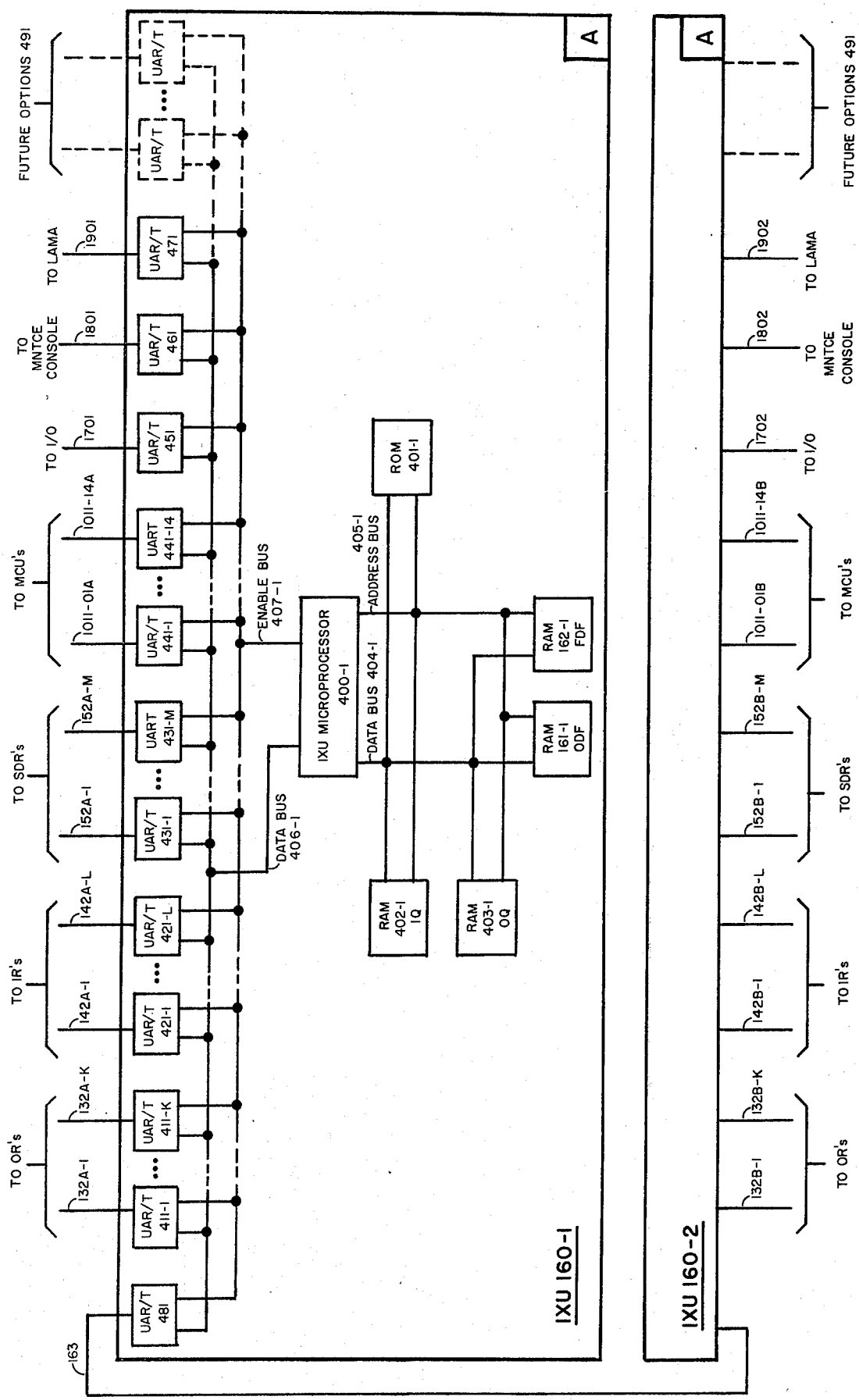
FIG. 4 depicts the functional arrangement of a pair of information exchange units suitable for use in accordance with the principles of the invention.

IXU 160-1 and IXU 160-2 of FIG. 1B are shown in greater functional detail in FIG. 4.

The major functional element of IXU 160-1 is the IXU microprocessor 400-1 which accesses IXU program store ROM 401-1, input queue RAM 402-1, output queue RAM 403-1, office data file (ODF) RAM 161-1, and feature data file (FDF) RAM 162-1, over address bus 405-1 and data bus 404-1.

IXU microprocessor 400-1 gains access to communication ports, each equipped with a UAR/T, via enable bus 407-1 and data bus 406-1. UAR/T's 411-1 through 411-K have transmit/receive busses 132A-1 through 132A-K, respectively, extending to the originating registers. UAR/T's 421-1 through 421-L have transmit/receive busses 142A-1 through 142A-L, respectively, extending to the incoming registers. UAR/T's 431-1 through 431-M have transmit/receive busses 152A-1 through 152A-M, respectively, extending to the senders. UAR/T's 441-1 through 441-14 have transmit/receive busses 1011-01A through 1011-14A, respectively, extending to the 14 switching network module control units.

UAR/T's 451, 461, and 471 have transmit/receive busses 1701, 1801, and 1901 extending to an I/O controller, a maintenance and administration console facility, and a LAMA facility, respectively. UAR/T 481 has transmit/receive busses 163 extending to mate IXU 160-2. Dotted lines represent UAR/T's for any future optional additions 491. Bus designations of FIG. 4 correspond to those shown in the system diagram of FIG. 1A and FIG. 1B.

ROM 401-1 contains IXU routines which enable the IXU microprocessor 400-1 to sequentially poll and, if necessary, serve UAR/T communication ports, administer the input and output message queues of RAM 402-1 and 403-1, and generate proper addresses for accessing ODF 161-1 and FDF 162-1. Input queue entries of RAM 402-1 and output queue entries of RAM 403-1 are all 16 bytes in length wherein each byte is comprised of 8 binary bits, which corresponds to the maximum allowable serial control message size. Message formats are detailed in a later section of the specification.

The IXU subsystem is provided in duplicate for reliability purposes. Hence IXU 160-2 of FIG. 4 is identical in functional detail to the elements of IXU 160-1 as shown in the box labeled A. In the event of a required switchover from one IXU to the other, busses 163 are utilized to update input and output queue information in the newly on-line unit. The contents of ODF 161-1 and FDF 162-1 are duplicated in the RAM sections of IXU 160-2, also for reliability purposes.

UAR/T — FIG. 5

The universal asynchronous receiver/transmitter device (UAR/T), used extensively in the illustrative embodiment of the invention, is a general purpose, programmable MOS/LSI device for interfacing an asynchronous serial data bus of a peripheral terminal with parallel data from a computer bus. These devices are now well-known in the art and are readily available from a number of manufacturers including Western Digital Corporation (e.g. AY-5-1012), and Motorola Semiconductors (e.g. ACIA XC6850).

Figure 5:
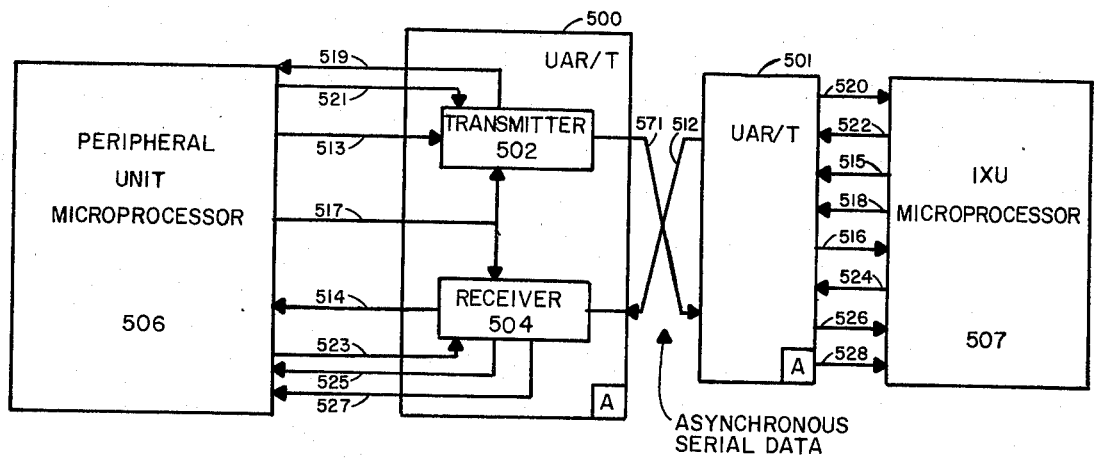
FIG. 5 depicts the functional arrangement of a pair of universal asynchronous receiver/transmitter devices suitable for providing control interfaces in accordance with the principles of the invention.

A functional block diagram of this type device is shown in FIG. 5 wherein two UAR/T elements, 500 and 501, are shown connected over transmit/receive busses 511 and 512. For purposes of example, UAR/T 500 is assumed to be associated with a peripheral control unit having a microprocessor 506, while UAR/T 501 is assumed to be associated with a communication port of IXU microprocessor 507. The elements internal to UAR/T 501 are identical to those shown in the box labeled A for UAR/T 500.

Transmitter section 502 of UAR/T 500 converts parallel data presented over parallel bus 513 from microprocessor 506 and converts this data into a serial word which also contains start, parity, and stop bits for serial transmission over path 511. Receiver section 504 accepts serial messages from path 512, deletes the start, stop, and parity bits, and converts the message into parallel data for transmission over bus 514 to microprocessor 506. Additionally, receiver unit 504 checks for proper parity and receipt of a valid stop bit on all incoming data messages. Other control paths between UAR/T 500 and microprocessor 506 include path 519 which indicates transmitter status, path 521 which carries transmitter clock signals, path 523 which carries receiver clock signals, path 525 which indicates receiver status, path 527 which indicates data error flags, and path 517 which carries miscellaneous signals for controlling receiver and transmitter shift registers. These signals include the capability for generating an interrupt signal to the peripheral unit microprocessor thus informing it that input data at the UAR/T is awaiting input to the microprocessor system.

UAR/T 501 functions in the identical manner using parallel data busses 515 and 516, transmitter status path 520, miscellaneous control bus 518, transmitter clock path 522, receiver clock path 524, receiver status path 526, and data error flag bus 528.

SERVICE CIRCUITS — FIGS. 6, 7, 8

Detailed functional arrangements for an originating register (OR), an incoming register (IR), and a sender (SDR) are shown in FIGS. 6, 7, and 8, respectively. These three types of service circuit are provided in three separate pools as shown in FIG. 1A.

FIG. 6 shows a functional arrangement of OR 130-1 of FIG. 1A. All logic functions and timing are under programmed control of microprocessor 630 which accesses its program store ROM 631, temporary store RAM 632, control interface 633, and UAR/T's 634 and 635 via 16-bit parallel address bus 641 and 8-bit parallel data bus 642.

ROM 631 contains programs enabling the processing of service requests from lines by means such as dial tone application and removal, digit reception and registration, and digit analysis in coordination with the office data file. ROM 631 also contains routines for generating serial control messages to other system control units.

RAM 632 provides temporary memory for constructing a call record which includes such items as digit registers, line identification and class of service storage, and party test or coin present test results.

Interaction of the OR with other system control units is via UAR/T access to the system IXU elements. UAR/T 634 provides access to IXU 160-1 via path 132A-1, while UAR/T 635 provides access to IXU 160-2 via path 132B-1.

Control interface 633 provides addressable units having a parallel control bus and a parallel data bus for accessing various functional OR hardware elements. Control path 670 and data path 671 access party test control logic 661. Logic element 661 is operative to test for one of two parties sharing the same line loop facility. Control path 672 and data path 673 access dial tone control 662, which applies dial tone to the line requesting service and removes dial tone when the OR detects the presence of the first digit. Control path 674 and data path 675 access coin test control 663 used on calls originating from pay stations where special potentials are used for standard coin control functions such as coin-present, coin-collect, and coin-return. Control path 676 and data path 677 access toll diversion logic 666 which applies a special signal to a private branch exchange (PBX) to inform the PBX control elements that a line restricted to local service is attempting an illegal toll call.

Control path 678 and data path 679 access dial pulse (DP) receiver 667. DP receiver 667 detects open or closed line loop conditions (under control of the customer station set) to provide detection of single dial pulses which are counted and stored by the OR microprocessor routines. Line disconnect is also detected at functional unit 667. Control path 680 and data path 681 access an optional KC receiver 668, required for use with pushbutton-type telephone sets. All OR's are always provided with a DP receiver while the KC receiver is an optional plug-in card.

All hardware control elements 661, 662, 663, 666, 667, and 668 have common access to switching network module outlets via path 131-1 which consists of two speech path conductors and two control leads for path status and disconnect supervision.

FIG. 7 shows a detailed functional diagram of IR 140-1 of FIG. 1A. As with the OR's, all IR logic and timing functions are under programmed control of a microprocessor per register. Microprocessor 740 accesses its program store ROM 741, temporary store RAM 742, control interface 743, and UAR/T's 744 and 745 via 16-bit parallel address bus 751 and 8-bit parallel data bus 752.

ROM 741 contains programs enabling the processing of service requests from trunks by means such as start-dialing signal application, digit reception and registration, and digit analysis in coordination with the office data file. ROM 741 also contains routines for generating control messages to other system control units. RAM 742 provides temporary memory for constructing a call record which includes such items as digit registers and trunk identification and class of service storage.

Interaction of the IR with other system control units is via UAR/T access to the system IXU elements. UAR/T 744 provides access to IXU 160-1 via path 142A-1, while UAR/T 745 provides access to IXU 160-2 via path 142B-1.

Control interface 743 provides addressable units having a parallel control bus and a parallel data bus for accessing various functional IR hardware elements. Control path 771 and data path 772 access supervision control 761 which includes logic for returning required start/stop dialing signals to distant switching facilities and which also monitors for call abandonment. Control path 773 and data path 774 access DP receiver 762 which, like the DP receiver in each OR, monitors open or closed loop conditions to provide single pulse detection for counting and storing by the IR microprocessor. Control path 775 and data path 776 access an optional multifrequency (MF) receiver required for use with those trunks utilizing the MF type of interoffice signalling. All IR's are always provided with a DP receiver, while the MF receiver is an optional plug-in element.

All IR hardware control elements 761, 762, and 763 have common access to switching network module outlets via path 141-1 which consists of the two-wire speech path and two control leads for paths status and disconnect supervision.

FIG. 8 shows functional details of SDR 150-1 of FIG. 1A. Again, a dedicated microprocessor per SDR controls logic and timing functions. Microprocessor 850 accesses program store ROM 851, temporary store RAM 852, control interface 853, and UAR/T's 854 and 855 via 16-bit parallel address bus 856 and 8-bit parallel data bus 857.

ROM 851 contains programs controlling the interoffice signalling functions required on outgoing calls originated by lines or trunks. ROM 851 also contains routines for generating control messages to other system control units. RAM 852 provides temporary memory for constructing a call record which includes such items as registers for digits to be outpulsed, type of start-stop signalling to be used on a particular call, and outgoing trunk identification.

Interaction of the SDR with other system control units is via UAR/T access to the system IXU elements. UAR/T 854 provides access to IXU 160-1 via path 152A-1, while UAR/T 855 provides access to IXU 160-2 via path 152B-1.

Control interface 853 provides addressable units having parallel control and data busses for accessing various functional SDR hardware elements. Control path 871 and data path 872 access supervision control 861 which includes logic for recognizing start-dialing signals from distant switching offices. Control path 873 and data path 874 access loop outpulser 862 whose timing and operation are under microprocessor program control. Control path 875 and data path 876 access battery/ground outpulser 863 which places potentials of opposite polarity on the two trunk speech path conductors to gain a longer loop length signalling range than that provided by the loop outpulser 862, which merely opens and closes the loop for pulse signalling. Control path 877 and data path 878 access an optional MF outpulser 864 required for use with those trunks using MF interoffice signalling. All SDR's are always provided with DP outpulsers, while the MF pulser is an optional plug-in card.

DATA FORMATS — FIGS. 9, 10, 11A, 11B

As previously mentioned, serial control messages passed between control units via the IXU are comprised of at least one 8-bit byte. The maximum length control message that can be accommodated by an IXU queue entry is 16 bytes. Each byte of the control message has the low order 4 bits reserved for message type conventions and the high order 4 bits reserved for data or instructions. Hence with this structure, control messages are variable in length from 1 to 16 bytes.

FIG. 9 shows the control message conventions adopted for the illustrative embodiment. These conventions apply to each receiving-end microprocessor, be it that of a peripheral control unit or that of an IXU.

If bits $b1-b0 = 11$, then the remaining 6 bits, $b2$ through $b7$, are to be interpreted as a destination address for the subsequent bytes of the message. This arrangement provides for a maximum of 64 addressable destinations. Such an address byte is used by the IXU to properly forward the message to the proper control unit. This byte can be deleted prior to message forwarding but could be retained for use by the receiving unit as a sanity check word.

If bits $b1-b0 = 10$, the remaining 6 bits, $b2$ through $b7$, are to be interpreted as the address of the unit originating the message. This byte is not really required by the IXU which can determine the identity of the originating unit by the address of the originating unit's UAR/T port. However the final destination unit can make good use of the originating address for return messages, and the IXU can also use such an address byte as a sanity check word.

FIG. 9 also shows 4-bit codes for five conventional interpretations by a receiving unit. If bits $b3-b6 = 0101$, the instruction or data in bits $b7-b9$ is a continuing portion of a multi-byte control message. If bits $b3-b0 = 1001$, the data in bits $b7-b4$ is to be interpreted as a cyclic redundancy character, used as a check over a series of message bytes for error detection. If bits $b3-b0 = 1101$, then bits $b7-b4$ are interpreted as the last information-bearing character of a multi-byte message. If bits $b3-b0 = 0000$, then bits $b7-b4$ contain a trouble condition code. As shown in FIG. 9, four other $b3-b0$ bit patterns are reserved for future optional applications. It should be noted that the data or instruction in the high order four bits of message bytes are locally interpreted by the intercommunicating microprocessors. The uses of this 4-bit field are independent and functions solely of the program stored at each particular control unit.

Figure 10:
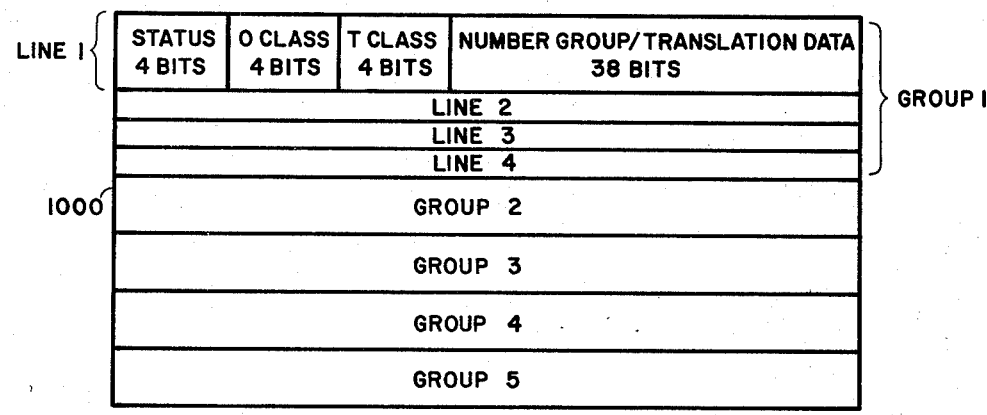

Line/trunk control cards were previously discussed in connection with the description of the switching network module control unit (MCU). FIG. 10 depicts the logical data organization for the memory associated with a line control card wherein each module inlet terminal assigned to a line is given 50 bits of control card memory.

For addressing purposes, each card memory has a capacity of 20 lines, divided into five groups of four lines each. The 50 bits per line are allocated as follows: 4 bits for line status, 4 bits for originating class mark, 4 bits for terminating class mark, and 38 bits for number group data. The 38 number group bits are further subdivided into space for a maximum of two, four-digit directory numbers (each digit represented by 4 bits for a total of 32 bits) and 6 bits of miscellaneous translation information which indicates such things as which directory number is assigned to which party on the line in question. The originating and terminating class marks include a special code flagging the line as having special features (e.g. abbreviated dialing). This flag serves as a subsequent indicator that access to the feature data file (FDF) is required to determine pertinent line information. With this arrangement of using FDF pointers, there is theoretically no limit to the number of class marks available.

Physically the control card memories are comprised of 256 8-bit solid-state memory words, where half of each 256 × 8 array is associated with one line control card.

Figure 11A:
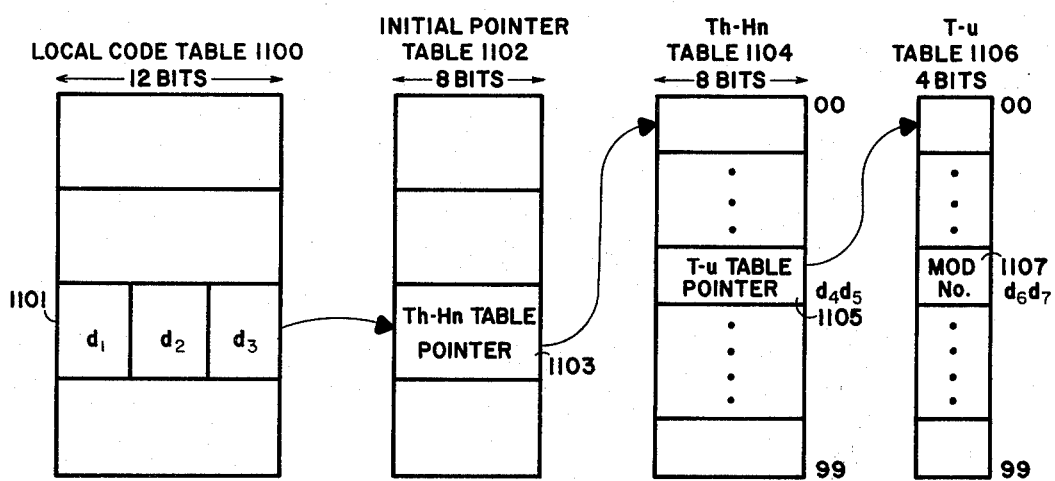

Basic routing data tables are maintained in the office data file (ODF) and are used in conjunction with that data kept on the control cards at the switching network modules. FIG. 11A depicts the data organization utilized for a typical number group translation at the ODF.

For the sake of example, a locally dialed number is assumed of the form $d_1d_2d_3$-$d_4d_5d_6d_7$, where digits $d_1d_2d_3$ form the office code and $d_4$ through $d_7$ are termed thousands, hundreds, tens, and units, respectively. The first step in the ODF number group translation consists of a data search of local code table 1100 of FIG. 11A. The entries of table 1100 are scanned for a match with dialed digits $d_1d_2d_3$. Table 1100 contains four entries thus providing the system with a maximum of four locally-terminating office codes. Assume a match is found at entry 1101 of table 1100. Since this match is in entry number 3 of table 1100, the translation routine proceeds to the third entry, 1103, of initial pointer table 1102. Entry 1103 of table 1102 contains the address of the first word of Thousands-Hundreds table 1104. Table 1104 is entered with an index equal to the value of dialed digits $d_4d_5$ to table entry 1105. Entry 1105 contains a further address pointer to the first word of tens-units table 1106. Table 1106 is entered via an index equal to the value of dialed digits $d_6d_7$ to table entry 1107 which contains the final desired answer in the form of a 4-bit number indicating which switching network module can terminate the locally-completing call. Specific network inlet identification of the called party is subsequently obtained from control card data maintained at the selected switching network module.

Figure 11B:
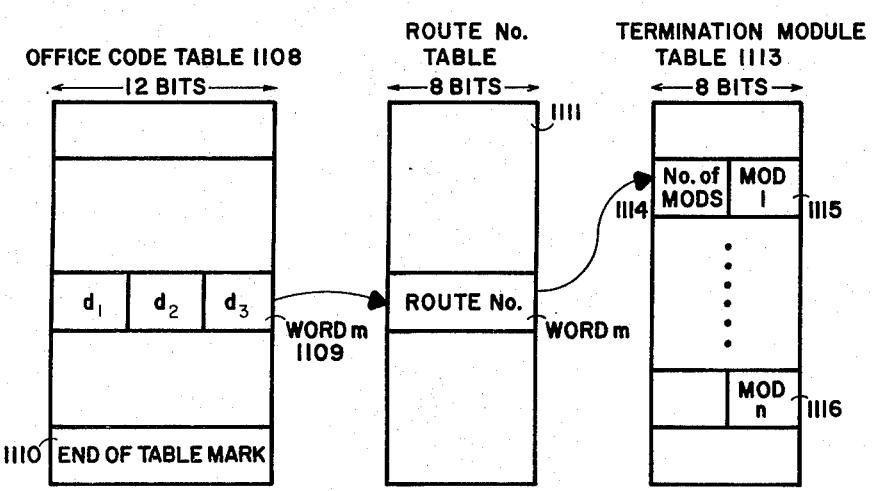

FIG. 11B shows steps in an ODF three-digit translation for a distant office code $d_1d_2d_3$. If no match were found in scanning the local office code table 1100 of FIG. 11A, a similar scan-until-match procedure would be initiated at office code table 1108 of FIG. 11B. Office code table 1108 is of variable length and is end-marked by a special flag word 1110. Assume a match on $d_1d_2d_3$ is found at word M of table 1108. This serves as a pointer into word M of route number table 1111 which contains the desired route number associated with the dialed office code $d_1d_2d_3$. The route number is only a part of the desired translation answer and is further used as the basis for generating an index into the termination module table 1113. At the indexed table entry is found a 4-bit number, 1114, giving the number of different switching network modules having trunks of the desired route. Following this number is a list of the individual module numbers themselves. This list, along with the route number, is subsequently used by the module control units to complete the outgoing call to a proper trunk.

LOCAL-TO-LOCAL CALL DESCRIPTION FIG. 12

Further insight into the cooperative actions of system elements of the illustrative embodiment may be gained by presentation of specific examples of call processing tasks. The first call processing example involves a call between two lines terminating at the local office (intraoffice or local-to-local call). There are two types of local-to-local call: intramodule calls wherein both calling and called lines terminate on inlets of the same switching network module, and intermodule calls wherein the called line appears at an inlet of a module different from that terminating the calling line.

For the present example, assume an intermodule local-to-local call. FIG. 12 is a representation of switching network connections involved in the various stages of setting up a call from party A to party B and is to be consulted in addition to other cited figures hereinbelow in aiding in the call description. Calling party A at station set 1401 has a line facility terminating on inlet 102-0200 of A-stage switch (ASW) 1410 of originating module 100-01. Called party B at station set 1451 has a line facility terminating on inlet 102-0400 of ASW 1460 of terminating module 100-02.

Party A goes off-hook at station 1401, and the scanning routine of LTC microprocessor 350 of MCU 101-01 (FIG. 3A) detects the line state change by examining the line/trunk control cards 354 which are connected to the lines at the inlet side of the network module as shown in FIG. 3A and enters the line address in a hit timing list in RAM 352. After appropriate hit timing by LTC 350, party A is recognized as legitimately off-hook, and LTC 350 forwards the service request along with the party A line class data over paths 3133A and 3133B and PI 313 to MC microprocessor 310 of MCU 101-01 (FIG. 3B). MC 310 recognizes the request as an interrupt signal generated at peripheral interface 313.

MC 310 forms a control message for serial transmission via UAR/T 314 and serial by-bit bus 1011-01A to the on-line IXU 160-1. The basic message contents are:
1. Type — request for an idle OR
2. Originating module number
3. Party A line identification in the form of a four-digit directory number
4. Party A class mark data.

The above message is received at IXU 160-1 over UAR/T 441-1 (FIG. 4). IXU microprocessor 400-1, during a poll of various UAR/T inputs, determines that such a message is forthcoming and places the message as received, byte-by-byte, into an appropriate input message queue of RAM 402-1. When the complete message has been received and stored in RAM 402-1, IXU microprocessor 400-1 determines from the message type that an OR of the type designated by party A's originating class mark is required. A rotator routine is then used by microprocessor 400-1 to provide for even distribution of OR usage. Assume, for this example, that OR 130-1 (FIG. 6) is seized and made busy by examination and flagging of its corresponding address in output queue RAM 403-1. IXU 160-1 then forwards, by way of the output queue RAM 403-1 and UAR/T 411-1, the control message contents to the selected OR 130-1 over serial bus 132A-1.

The microprocessor 630 of OR 130-1 (FIG. 6) determines the type of receiver required from the class data for party A and stores the class marks, calling party A's directory number, and the originating module number in a call record in the OR's temporary store RAM 632. OR 130-1, from the originating module number, determines the identification of its outlet appearance, 1431 (FIG. 12), for originating module 100-01. Microprocessor 630 also addresses dial tone control 662 and primes it to await detection of a through connection to the calling party's loop via the network module switches. OR 130-1 next forms a connect request message for forwarding over UAR/T 634, bus 132A-1, via IXU 160-1 to MCU 101-01. The basic message contents are:
1. Destination address — originating module 100-01
2. Type — line to register connect request 3. OR 130-1 identification and outlet 1431 identification
4. Calling party A four-digit directory number.

IXU 160-1 initiates the forwarding of the above message to MCU 101-01 by sending the first message byte to UAR/T 314 (FIG. 3B) whereupon UAR/T 314 generates an interrupt signal to MC microprocessor 310. MC 310 then collects the entire message and places it in a call record in RAM 312. MC 310, after analyzing the message type, forwards the A party four-digit directory number over bus 3133B to LTC microprocessor 350 (FIG. 3A) for translation into an inlet terminal number. LTC 350, using a scan routine over the number group information stored at line control cards 354, converts the four-digit directory number to an inlet number and passes this invormation back to MC 310 over bus 3133B.

Next, MC 310 passes the inlet number of party A and the outlet number of OR 130-1 over bus 3132B to SSC microprocessor 330 (FIG. 3B). SSC 330, in conjunction with scan point matrices 334 and 335, searches for a network path between inlet 102-0001 and outlet 1431. If no path is available, SSC 330 must so inform MC 310 which, in turn, informs OR 130-1 via an IXU control message whereupon OR 130-1 informs IXU 160-1 to select another available OR, to transfer the call record information to the newly selected OR, and to restart the call processing function. (This assumes that each OR in the system has only a single appearance on each switching network module.) Assume for the present example that a path from inlet 102-0001 to outlet 1431 is available. The pertinent A-link and B-link data is forwarded over bus 3132B from SSC 330 to MC 310 which uses this data to close the corresponding network crosspoints via orders to ASW control 316, BSW control 317, and CSW control 318 (FIG. 3B). The resulting path for this example extends as shown in FIG. 12 from inlet 102-0001 through crosspoint 1412 of ASW 1410, over A-link 1411, through crosspoint 1422 of B-stage switch (BSW) 1420, over B-link 1421, through crosspoint 1432 of C-stage switch (CSW) 1430, to module outlet 1431, the termination point at module 100-01 for OR 130-1. It should be noted that path 131-1 of FIG. 6 is, in this example, physically connected to outlet 1431 of FIG. 12 (and to one outlet on all the other switching network modules).

OR 130-1 (FIG. 6), using dial tone control 662, detects the cut-through to the customer loop of party A and, via an interrupt, so informs OR microprocessor 630. From party A's class marks stored in the call record in RAM 632, the OR 130-1 determines whether a party test is required. After any required party test, dial tone is returned to party A from dial tone control circuit 662 as a signal to commence dialing.

OR 130-1 removes dial tone upon detecting the first dial pulse or pushbutton digit received from station set 1401 at DP receiver 667 or KC receiver 668. All digits are registered as received in the OR software call record in RAM 632. The first dialed digit is passed (via serial control message) over UAR/T 634, bus 132A-1 and UAR/T 411-1 to the office data controller (ODC) routine of IXU microprocessor 400-1 (FIG. 4) which, in conjunction with the office data file (ODF) in RAM 161-1, performs a single digit analysis. Assume for the present case that the initial digit is not part of a special one or two digit access code. Under this condition the ODC routine of IXU 160-1 informs OR 130-1 over the previously described serial path that further digit analysis will be required at the completion of the third digit received from party A. OR 130-1 collects the second and third digits at the appropriate receiver circuit and forms a three-digit translation request for the ODC routine of IXU 160-1.

As described previously in conjunction with FIG. 11A, ODC determines from the first three digits that a locally terminating call is in progress. Hence a message is returned to OR 130-1 indicating the need for further analysis after receipt of seven digits.

During the one and three-digit analyses, OR 130-1 is continually receiving digits from party A via DP receiver 667 or KC receiver 668. On receipt of the seventh digit, OR 130-1 requests a four-digit station code translation. As previously described in FIG. 11A, the ODC routine of IXU 160-1 accesses the appropriate translation file in ODF RAM 161-1 by keying on the three-digit office code. The four-digit station number is then used to obtain the required terminating module number, for this case module 100-02. This result is transmitted back to OR 130-1 and stored in the OR call record of RAM 632.

In response to receipt of the translation result, OR 130-1 performs a comparison test on the identification numbers of the originating and terminating switching network modules and on the calling and called four-digit station numbers. If a match is found, a revertive call (between two parties on the same line) is in progress. Assume for this example that no such match occurs.

OR 130-1 forms a connect request message for transmission via IXU 160-1 to originating module 100-01. The message basically includes:
1. Type — connect module inlet to junctor circuit appearance
2. Terminating module number
3. Four-digit calling number (party A)
4. four-digit called number (party B)
5. Originating module identification (destination address for the message).

This message is forwarded from IXU 160-1 to MCU 101-01 (FIG. 3B) which, from this point, assumes control of the call. However OR 130-1 does not yet drop out as it is monitoring party A for abandonment through use of DP receiver 667.

MC microprocessor 310 analyzes the IXU message received over UAR/T 314 and determines from the terminating module number that an intermodule junctor (ITMJ) to terminating module 100-02 is required. Assume, as shown in FIG. 12, ITMJ 1445 is selected and made busy by proper manipulation of software status maps in RAM 332 by SSC microprocessor 330 on demand request over busses 3132A and 3132B from MC 310. ITMJ 1445 is selected in conjunction with a software rotator at SSC 330 to promote even distribution of junctor circuit usage. Next SSC 330 uses its path search routine in conjunction with scan matrices 334 and 335 to hunt for an idle path from calling party A to ITMJ 1445 at module outlet 1433 (FIG. 12). The resulting path information and junctor identity is passed back to MC 310 over busses 3132A and 3132B. It should be noted that the path search is performed using the same A-link, 1411 of FIG. 12, used in the existing connection from party A to OR 130-1. With this method, the connection from party A to ITMJ 1445 can be set from MC microprocessor 310 in conjunction with BSW control 317 and CSW control 318 (FIG. 3B) by closing crosspoint 1434 of CSW 1431 and crosspoint 1424 of BSW 1420 (FIG. 12). Since only one codeswitch crosspoint per vertical column can be closed at one time, the operation of BSW crosspoint 1424 will automatically open crosspoint 1422 thereby effectively dropping the connection from party A to OR 130-1. ITMJ 1445 recognizes the cut-through to the line loop facility of party A and sets its state for supervision of party A via the network path including B-link 1423 and A-link 1411. OR 130-1 recognizes the opening of the connection to party A at DP receiver 667 (FIG. 6), clears its call records in RAM 632, and informs IXU 160-1 via bus 132A-1 that the OR 130-1 is idle and available for another call.

After completing the above-described path from party A to ITMJ 1445, MC 310 forms a control message for MCU 101-02 (FIG. 3C and 3D) sent via IXU 160-1 informing MC 320 via an interrupt from UAR/T 324 that a termination function is required from ITMJ 1445 to the inlet terminal of called party B which is identified at this point by the last four digits dialed by calling party A. This termination function to be performed at MCU 101-02 includes:
1. Translation of the four-digit directory number by LTC 360 into a terminal number
2. Determination, from party B class data stored on line control cards 364, of allowability for connecting party A to party B
3. Determination by LTC 360 of busy/idle status of party B (assumed idle for this example)
4. Determination of proper ringing code for party B
5. Determination of an idle path from party B to the selected ITMJ 1445 using SSC 340.

If no path to ITMJ 1445 is available, SSC 340 so informs MC 320 over busses 3232A and 3232B. In turn, MC 320 informs, via IXU message, MCU 101-01 which issues a retrial with a different ITMJ. For the present example, an idle path is assumed found from party B to ITMJ 1445 proceeding from inlet 102-0400, through crosspoint 1462 of ASW 1460, over A-link 1461 through crosspoint 1473 of BSW 1471, over B-link 1472, through crosspoint 1482 of CSW 1480, to outlet 1481 which terminates ITMJ 1445 on module 100-02 (FIG. 12).

After the above path has been set under control of MC 320, SSC 340 is instructed by MC 320 to search for an idle path to an appearance of ring circuit 1490 on BSW 1471 (FIG. 12) using the same A-link 1461 of the path to the junctor circuit 1445. This approach effects path reservation from party B to ITMJ 1445 via crosspoint 1482 while party B is being rung. MC 320, using path setting routines in conjunction with ASW control 326, BSW control 327, and CSW control 328 (FIG. 3D), closes crosspoints 1462, 1473, and 1482 to ITMJ 1445 (FIG. 12). ITMJ 1445 recognizes the cut-through via a supervisory control lead associated with the connected path in module 100-02. ITMJ 1445 now cuts through audible ring tone to party A. At the same time, MC 320 in conjunction with BSW control 227 closes crosspoint 1474 to ring circuit 1490.

Ring circuit 1490 has at least one appearance on each BSW in the module (recalling from the network topology description in conjunction with FIG. 2 that each BSW has 30 outlets available for use as tone and ringing source terminations). While party B is receiving ringing current via BSW crosspoint 1474, crosspoint 1473 is open. On subsequent answer by party B, the conversation path to ITMJ 1445 is set under control of MC 320 by operation of BSW crosspoint 1473 which automatically opens crosspoint 1474.

Ringing circuit 1490 passes ringing current to party B and monitors for answer supervision. Upon recognizing party B off-hook, ringing circuit 1490 disconnects its ringing generator and removes ground from a supervisory control lead associated with the path from party B to the ringing circuit. The control lead release is sensed by the scan routine of SSC 340 which directs MC 320 to establish the talk path to ITMJ 1445. This connection is effected by closing BSW crosspoint 1473 via BSW control 327 which automatically opens crosspoint 1474 thereby releasing the connection to ringing circuit 1490.

Establishment of the talk path through the network of module 100-02 causes ITMJ 1445 to remove audible ringing tone to party A and to assume a talk state wherein station set battery and supervision monitoring elements are supplied to both parties A and B from the junctor circuit 1445. The conversation path consists of party A connected to inlet 102-0001 of module 100-01, through crosspoint 1412 of ASW 1410, over A-link 1411, through crosspoint 1424 of BSW 1420, over B-link 1423, through crosspoint 1434 of CSW 1431, through ITMJ 1445 to outlet 1481 of module 100-02, through crosspoint 1482 of CSW 1480, over B-link 1472, through crosspoint 1473 of BSW 1471, over A-link 1461, through crosspoint 1462 of ASW 1460, to party B at module inlet 102-0400.

Where local automatic message accounting (LAMA) is provided, upon answer detection at party B, MC 320 (FIG. 3D) passes the calling number, called number, and junctor number to the recording system via IXU 160-1 and subsequently over UAR/T 471 (FIG. 4) for an initial entry. The LAMA system is considered to be a separate embodiment interfaced via the IXU and is not a part of the system of the invention.

The SSC microprocessors in MCU 101-01 and MCU 101-02 scan for disconnect after the talk state is reached between parties A and B. Upon disconnect, the SSC microprocessor detecting the condition reports to the MC microprocessor of its associated MCU for initiation of proper idling of resources associated with the call and, where required, for initiation of a control message to the LAMA system for generation of a disconnect entry.

OUTGOING TRUNK CALL DESCRIPTION — FIG. 13

The second call processing example involves a locally-originated, outgoing call to a distant office and is described in conjunction with FIG. 13 along with the functional block diagrams of the components involved. For this example, we assume an intermodule call from party A with station set 1501 appearing at inlet 102-0200 of module 100-01 to trunk (TRK) 1551 terminated at inlet 102-0201 of module 100-02.

When party A goes off-hook an OR such as 130-1 is selected and connected to party A whereupon dial tone is returned, all in a manner identical to that described for the local-to-local call example. The switching network connection is from inlet 102-0200, through crosspoint 1512 of ASW 1510, over A-link 1511, through crosspoint 1522 of BSW 1520, over B-link 1521, through crosspoint 1534 of CSW 1530 to outlet 1532 which terminates OR 130-1 at module 100-01. Also as described in the local-to-local call example, OR 130-1 requests a three-digit translation on the first three digits received from party A. The following data is returned to OR 130-1 from the ODC routine of IXU 160-1:
1. The fact that a sender of a specific type will be required for this call
2. Number of subsequent incoming digits to expect
3. Number of digits to be outpulsed (assume no code conversion, digit deletion, etc., required for this example)
4. Trunk routing number
5. Module numbers of those network modules which terminate one or more trunks of the required route
6. Whether or not alternate routes are available OR 130-1 now forms a control message for originating module control unit MCU 101-01. The message content includes:
1. Type — perform an outgoing trunk search
2. Calling party A identification
3. OR 130-1 identification
4. Route number
5. Module numbers of those modules terminating one or more trunks of the required route As previously described in conjunction with FIG. 11B, the answer data for a three-digit translation request consists of a route number and a set of module numbers identifying those switching network modules having trunks of the required type. The originating MCU 101-01, upon receipt of the above message, must now search for an idle trunk of the desired route by sequentially interrogating modules containing these trunks. For control considerations, the optimum first choice termination module is the originating module itself, provided that it is among the modules terminating the desired trunks (this lowers the number of required intermodule control messages for processing the call). Hence under this strategy, MC 310 of MCU 101-01 examines the list of module numbers to see if its own number is included. If so, MC 310 instructs LTC 350 (FIG. 3A) to examine the status of trunks of the required route as maintained on trunk control cards at the module. For this example, assume MC 310 determines that no such trunks are available in module 100-01. Hence MC 310 takes the next module number (for this case, module 100-02) from the translation result list saved in a call record of RAM 312, and sends a control message via the IXU 160-1 to MCU 101-02 requesting a trunk search for the required route number.

For the present example, assume MCU 101-02 finds an idle outgoing trunk, TRK 1551, of the required route. MCU 101-02 informs MCU 101-01 that a trunk has been found and made busy. MCU 101-01 now selects an idle ITMJ, for this case ITMJ 1545, in a manner similar to that described in the preceding example. A path to ITMJ 1545 is selected by SSC 330 (FIG. 3B) which includes A-link 1511 of the path to OR 130-1. The C stage crosspoint 1535 of this selected path is closed to reserve B-link 1523. BSW crosspoint 1524 is not operated at this time as this would open the connection from party A to OR 130-1.

MCU 101-01 now sends a control message to MCU 101-02 via IXU 160-1 identifying both the selected ITMJ 1545 and the OR 130-1, and instructing MCU 101-02 to proceed with talk path reservation and sender selection. SSC 340 of MCU 101-02 (FIG. 3D) selects an idle path from TRK 1551 at inlet 102-0201 to ITMJ 1545 at outlet 1581 (FIG. 13). The path is temporarily set up via crosspoints 1562, 1572, and 1582 of ASW 1560, BSW 1570, and CSW 1580, respectively, using ASW, BSW, and CSW control interfaces 326, 327, and 328 under the direction of MC 320. MC 320 now sends a control message to the on-line IXU 160-1 requesting an idle sender (SDR) of a type required for the trunk selected (e.g. dial pulse or multifrequency type). This message also identifies the OR 130-1 which is involved in the call at hand. SDR usage is evenly distributed via a software implemented rotator at the IXU. The IXU returns the identity of the selected SDR 150-1 to MCU 100-02. The OR 130-1 identification is saved in the SDR call record in its RAM 852 (FIG. 8) for future reference. With previously described cooperative actions, MC 320 and SSC 340 hunt for and establish a path in module 100-02 between TRK 1551 and SDR 150-1.

All senders of the system have one module outlet appearance on every CSW of every module. Hence MCU 101-02 can connect SDR 150-1 to TRK 1551 merely by operating a single crosspoint 1583 in CSW 1580 — the same third stage switch used in the path from TRK 1551 to ITMJ 1545 in module 100-02. With this method the talk path to the ITMJ is opened but reserved for use at the completion of the sending function. To summarize to this point, SDR 150-1 is now connected to TRK 1551 from outlet 1591, through crosspoint 1583 of CSW 1580, over B-link 1571, through crosspoint 1572 of BSW 1570, over A-link 1561, through crosspoint 1562 of ASW 1560 to inlet 102-0201.

On recognizing, through use of supervision control circuit 861 (FIG. 8), path cut-through to TRK 1551, SDR 150-1 sends a request over UAR/T 854 via IXU 160-1 for pertinent call data to OR 130-1. OR 130-1 returns a message informing SDR 150-1 of the number of digits to be outpulsed and of any specific digits which have been received and stored in an OR call record in RAM 632 (FIG. 6) that are ready for immediate outsending to the distant office.

On a start-dialing signal from the distant office, SDR 150-1 initiates outsending in the proper mode — DP or MF via outpulsers 862 or 863 or 864 (FIG. 8). In the meantime, OR 130-1 continues to forward via the IXU any subsequent digits received from originating party A to the call record in SDR RAM 852. When OR 130-1 finishes receiving digits from party A, it notifies MCU 101-01 which, in turn, using MC 310 and BSW control 317 (FIG. 3B) operates crosspoint 1524 of BSW 1520 and, at the same time, establishes the talk path from party A to ITMJ 1545. ITMJ 1545 now supervises party A for disconnect. The DP receiver 667 of OR 130-1 detects the open path through module 100-01, clears its temporary memory call record in RAM 632, and informs IXU 160-1 of its newly idle condition.

On completion of outpulsing, SDR 150-1 sends a control message via IXU 160-1 to MCU 101-02 instructing MC 320 to:
1. Save the calling party A directory number and the called number along with identification of ITMJ 1545 for future LAMA recording, if so required, in a call record in RAM 322
2. Establish a talk path connection from ITMJ 1545 to TRK 1551

The talk path is established by MC 310 merely by instructing CSW control 328 to close crosspoint 1582 of CSW 1580. This action automatically opens crosspoint 1583, thereby releasing the connection to SDR 150-1. SDR 150-1 detects the open path at supervision control 861 (FIG. 8), clears its call record in RAM 852, and informs the on-line IXU 160-1 of its newly idle status.

ITMJ 1545 detects the path connection through module 100-02 to TRK 1551 and assumes a simple cut-through state wherein the speech path conductors are connected between outlets of module 100-01 and module 100-02. Talk battery and supervision elements are provided at TRK 1551. The final conversation path reaches from party A to inlet 102-0200, through crosspoint 1512 of ASW 1510, through crosspoint 1524 of BSW 1520, over B-link 1523, through crosspoint 1535 of CSW 1531, through ITMJ 1545 to outlet 1581 of module 100-01, through crosspoint 1582 of CSW 1580, over B-link 1571, through crosspoint 1572 of BSW 1570, over A-link 1561, through crosspoint 1562 of ASW 1560, to TRK 1551.

TRK 1551 monitors the distant office for answer supervision. Upon receipt of same by LTC 360 recognizing the trunk loop state, MCU 101-02 passes, via the IXU, the called and calling numbers, and the ITMJ 1545 identification saved in RAM 322 to the LAMA recorder, if such feature is provided.

A detailed call description is not presented for an incoming trunk call, since the processing steps, including translation, are very similar to the local-to-local case, except that an incoming register is selected for digit reception rather than an originating register. The call descriptions for the two cases above teach all essential subtasks required in the processing of the classical types of telephone switching office connections: line-to-line, line-to-trunk, trunk-to-line, and trunk-to-trunk.

Special consideration and handling is given to terminating calls involving incoming trunks with immediate dial from distant step-by-step offices. In this situation the incoming trunk is scanned by the LTC microprocessor of the involved MCU for the first digit while a connection to an incoming register is being set up to the incoming trunk. The IR is then updated by the originating MCU during subsequence digit receiving. This update includes any digit received prior to the establishment of the trunk to IR connection.

What is claimed is:

1. In a communication switching system, a plurality of lines, a plurality of switching network means for selectively interconnecting said lines, each of said switching network means including discrete stored program control means permanently associated therewith, information exchange means comprising a dedicated stored program control means and at least one memory means for storing system routing translation data, information transmission means connecting said information exchange means to said discrete stored program control means for said switching network means, a plurality of service circuit means, each of which is connected to each of said switching network means, and each of which includes a dedicated stored program control means permanently associated therewith, and means connecting said dedicated stored program control means of each of said service circuit means to said information exchange means for use in the establishment of a communication path over said switching network means.

2. A communication switching system as set forth in claim 1 in which each of said plurality of switching network means comprises a module connected to a different group of said lines, each of said modules includes a plurality of switches for completing switching paths in its module, and in which the discrete stored program control means for each module includes first processor means for scanning the group of lines associated with its module, second processor means for selectively operating said switches to selectively complete paths in its associated module, and third processing means for providing a status record of the switching paths in said module.

3. A communication switching system as set forth in claim 2 which includes first path means connecting said second processor means and said first processor means, second path means connecting said third processor means and said second processor means, and further means for connecting said second processor means to said information transmission means.

4. A communication switching system as set forth in claim 3 in which said first processor means includes a plurality of line control means having memory means for storing the current state, class marks, and number group translation information for each of said lines for said module.

5. A communication switching system as set forth in claim 3 in which said information transmission means includes a serial-by-bit bus for exchanging information between said information exchange means and discrete stored program control means in an asynchronous mode.

6. A communication switching system as set forth in claim 3 in which said information transmission means includes receiver-transmitter means operative to generate an interrupt signal for presentation over said further means to said second processor means responsive to the receipt of information from said information exchange means.

7. A communication switching system as set forth in claim 1 in which each of said discrete stored program control means for said switching network means includes processor means for scanning the group of lines connected to its switching network means, and means connecting the processor means for one of said switching network means to the processor means for at least one other of said switching network means for selective use in scanning of the lines of said other switching network means.

8. A communication switching system as set forth in claim 1 wherein said means which connect said dedicated stored program control means of each of said service circuit means to said information exchange means includes serial-by-bit bus means.

9. A communication switching system as set forth in claim 1 in which at least one of said switching network means includes at least one trunk circuit connected thereto, and in which said service circuit means includes at least one incoming register means for processing requests for services received over said switching network means from said trunk circuit, at least one sender means for transmitting call information over said switching network means to further switching systems, and at least one originating register means for processing requests for service received over said switching network means from said lines.

10. A communication switching system as set forth in claim 9 in which said information exchange means is operative in response to a signal request from said originating register means to transmit a code to a selected one of the switching network means which identifies the one of the switching network means to be selected for use in the extension of a communication path.

11. A communication switching system as set forth in claim 9 in which said originating register means is operative in response to signals received from one line in one of said switching network means which identifies a further line in the system to enable said information exchange means to transmit the identification of the one of the switching network means which is connected to said further line to the discrete stored program control means in said one switching network means.

12. A communication switching system as set forth in claim 11 in which at least one of said switching network means includes a plurality of outlets, an intramodule junctor circuit connected to a first and a second one of said outlets, an intermodule junctor circuit connected to a further one of said outlets, and in which said discrete stored program control means for said one switching network means is operative to select one of said junctor circuits in accordance with the switching network means which is identified as being connected to said further line.

13. A communication switching system as set forth in claim 1 in which said switching network means includes a plurality of inlets having lines connected thereto, and in which said discrete stored program control means for each switching network means includes means for translating directory number information received from said information exchange means to inlet identification signals for use in selecting the inlet identified by said signals.

14. A communication switching system as set forth in claim 1 in which each of said switching network means comprises a separate module, and each of which includes switches which are selectively operated by the discrete stored program control means for its associated module, and means for connecting the discrete stored program control means for one of said switching network means to control the switches in another of said switching network means.

15. A communication switching system as set forth in claim 1 in which at least one of said switching network means includes a plurality of inlets, each of which has a different one of said lines connected thereto, a plurality of outlets, and at least one intramodule junctor circuit connected to two of said outlets for use in extending switching paths between said inlets.

16. A communication switching system as set forth in claim 15 which includes at least one intermodule junctor circuit connected to at least one other of said outlets and an outlet on a further one of said switching network means for extending switching paths between said one and said further switching network means.

* * * * *